United States Patent
Park et al.

(10) Patent No.: US 12,130,756 B2
(45) Date of Patent: Oct. 29, 2024

(54) ACCELERATOR, METHOD OF OPERATING AN ACCELERATOR, AND ELECTRONIC DEVICE INCLUDING AN ACCELERATOR

(71) Applicant: SAMSUNG ELECTRONICS CO., LTD., Suwon-si (KR)

(72) Inventors: Hanmin Park, Hwaseong-si (KR); Hyung-Dal Kwon, Hwaseong-si (KR); Jaehyeong Sim, Hwaseong-si (KR); Seungwook Lee, Suwon-si (KR); Jae-Eon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/364,872

(22) Filed: Aug. 3, 2023

(65) Prior Publication Data
US 2024/0004809 A1    Jan. 4, 2024

Related U.S. Application Data

(63) Continuation of application No. 17/182,439, filed on Feb. 23, 2021, now Pat. No. 11,741,026.

(30) Foreign Application Priority Data

Aug. 31, 2020    (KR) .................. 10-2020-0110530

(51) Int. Cl.
*G06F 17/16*    (2006.01)
*G06F 13/16*    (2006.01)
*G06N 3/04*    (2023.01)

(52) U.S. Cl.
CPC ........... *G06F 13/1668* (2013.01); *G06N 3/04* (2013.01)

(58) Field of Classification Search
CPC ............................. G06F 13/1668; G06N 3/04
See application file for complete search history.

(56) References Cited

U.S. PATENT DOCUMENTS 10,255,547 B2 *  4/2019   Woolley, Jr. ......... G06V 30/142
10,411,709 B1 *  9/2019   Ghasemi ............... G06N 3/045
(Continued)

FOREIGN PATENT DOCUMENTS

EP    3 674 982 A1    1/2020
EP    3 330 899 B1    2/2021
(Continued)

OTHER PUBLICATIONS

Cho, Minsik, et al. "MEC: Memory-efficient Convolution for Deep Neural Network." International Conference on Machine Learning. PMLR, arXiv:1706.06873v1 Jun. 21, 2017, (10 pages in English).
(Continued)

*Primary Examiner* — Cheng Yuan Tseng
(74) *Attorney, Agent, or Firm* — NSIP Law

(57) ABSTRACT

An accelerator, a method of operating the accelerator, and an electronic device including the accelerator. A method of operating the accelerator configured to perform a target operation includes packing input data with a data layout determined based on a word width of a memory in the accelerator and a spatial size of a filter to be applied to the target operation and storing the packed input data in the memory, and performing the target operation between a portion of the input data stored in a same word in the memory and weights of the filter.

18 Claims, 24 Drawing Sheets

(56) References Cited

U.S. PATENT DOCUMENTS

| | | | |
|---|---|---|---|
| 10,417,560 B2* | 9/2019 | Henry | G06F 17/153 |
| 10,438,115 B2* | 10/2019 | Henry | G06N 3/044 |
| 10,572,225 B1* | 2/2020 | Ghasemi | G06F 7/5443 |
| 10,970,201 B2* | 4/2021 | Whatmough | G06N 3/063 |
| 10,984,500 B1* | 4/2021 | Sirasao | G06F 12/0207 |
| 11,106,968 B1* | 8/2021 | Ghasemi | G06F 17/16 |
| 11,157,814 B2* | 10/2021 | Howard | G06N 3/082 |
| 11,188,814 B2* | 11/2021 | Whatmough | G06N 3/063 |
| 11,222,256 B2* | 1/2022 | Teng | G06N 3/08 |
| 11,250,326 B1* | 2/2022 | Ko | G06N 3/08 |
| 11,403,530 B1* | 8/2022 | Ko | G06N 3/048 |
| 11,429,848 B2* | 8/2022 | Ng | H03K 19/177 |
| 11,443,176 B2* | 9/2022 | Rasch | G06N 3/084 |
| 11,493,985 B2* | 11/2022 | Ambardekar | G06F 1/3275 |
| 11,599,181 B1* | 3/2023 | Nair | G06N 3/0464 |
| 11,620,490 B2* | 4/2023 | Ng | G06N 3/045 706/27 |
| 11,657,119 B2* | 5/2023 | Sakharshete | G06N 3/063 708/520 |
| 11,741,026 B2* | 8/2023 | Park | G06N 3/045 710/5 |
| 11,783,163 B2* | 10/2023 | Liu | G06N 3/04 706/27 |
| 2018/0129935 A1 | 5/2018 | Kim et al. | |
| 2018/0285715 A1 | 10/2018 | Son et al. | |
| 2019/0079801 A1 | 3/2019 | Lyuh et al. | |
| 2019/0080239 A1 | 3/2019 | Yang | |
| 2019/0103857 A1 | 4/2019 | Zivkovic et al. | |
| 2019/0197083 A1 | 6/2019 | Chen et al. | |
| 2019/0205735 A1 | 7/2019 | Smelyanskiy et al. | |
| 2019/0311243 A1 | 10/2019 | Whatmough et al. | |
| 2019/0370644 A1* | 12/2019 | Kenney | G06N 3/045 |
| 2020/0034148 A1* | 1/2020 | Sumbul | G06N 3/063 |
| 2020/0242459 A1* | 7/2020 | Manipatruni | G06F 17/16 |
| 2020/0310758 A1* | 10/2020 | Desoli | G06N 3/063 |
| 2021/0390367 A1* | 12/2021 | Liu | G06F 9/30105 |

FOREIGN PATENT DOCUMENTS

| | | |
|---|---|---|
| KR | 10-2019-0099931 A | 8/2019 |
| KR | 10-2019-0129240 A | 11/2019 |
| WO | WO 2017/187516 A1 | 11/2017 |

OTHER PUBLICATIONS

Lym, Sangkug, et al. "DeLTA: GPU Performance Model for Deep Learning Applications with In-depth Memory System Traffic Analysis." 2019 IEEE International Symposium on Performance Analysis of Systems and Software (ISPASS), 2019. Pages 293-303.

Li, Ling, et al. "Memory Saving Method for Enhanced Convolution of Deep Neural Network." 2018 11th International Symposium on Computational Intelligence and Design (ISCID). vol. 1. IEEE, 2018. Pages 185-188.

Extended European search report issued on Feb. 3, 2022, in counterpart European Patent Application No. 21188191.7 (13 pages in English).

* cited by examiner

ACCELERATOR, METHOD OF OPERATING AN ACCELERATOR, AND ELECTRONIC DEVICE INCLUDING AN ACCELERATOR

CROSS-REFERENCE TO RELATED APPLICATIONS

This application is a Continuation Application of U.S. patent application Ser. No. 17/182,439 (now allowed) filed Feb. 23, 2021, which claims the benefit under 35 USC § 119(a) of Korean Patent Application No. 10-2020-0110530 filed on Aug. 31, 2020, in the Korean Intellectual Property Office, the entire disclosure of which is incorporated herein by reference for all purposes.

BACKGROUND

1. Field

The following description relates to an accelerator, a method of operating the accelerator, and an electronic device including the accelerator.

2. Description of Related Art

As an artificial intelligence (AI) technology progresses, there is a desire for specialized AI hardware that may perform inference and learning through operations. Various devices are being developed as hardware dedicated to the implementation of AI.

There is ongoing research on a hardware accelerator to efficiently use a deep neural network (DNN). A neural network processing device may need a great amount of operation for complex input data. A storage efficiency and an access cost of a memory may be a cause of performance bottleneck in numerous process systems

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an accelerator includes packing input data with a data layout determined based on a word width of a memory in the accelerator and a spatial size of a filter to be applied to a target operation and storing the packed input data in the memory, and performing the target operation between a portion of the packed input data stored in a same word in the memory and weights of the filter.

The storing may include packing input data corresponding to a plurality of filters based on the data layout, and storing the packed input data in one word.

The number of the filters may be determined based on a horizontal size and a vertical size of each of the filters, a number of channels of the input data, a stride size of each of the filters, and a number of operand pairs simultaneously processible by an operator configured to perform the target operation.

The storing may include storing the packed input data by performing an im2col transformation based on a spatial size and a stride size of a virtual filter that are determined based on the word width of the memory and the spatial size of the filter.

The performing of the target operation may include fetching the input data stored in the same word in the memory to an input register, fetching the weights of the filter to a filter register, performing a first target operation between a first portion of the input data fetched to the input register and the weights, and performing a second target operation between a second portion of the input data fetched to the input register and the weights.

The first portion of the input data and the second portion of the input data may include redundant data.

The performing of the target operation may include muxing the weights used for the first target operation, and performing the second target operation between the second portion of the input data and the muxed weights.

The performing of the target operation may include muxing the second portion of the input data fetched to the input register after the first target operation, and performing the second target operation between the muxed second portion of the input data and the weights.

The performing of the target operation may include muxing the weights used for the first target operation and re-storing the muxed weights in the filter register, and performing the second target operation between the second portion of the input data and the re-stored weights.

The performing of the target operation may include muxing the second portion of the input data fetched to the input register and re-storing the muxed second portion in the input register, after the first target operation, and performing the second target operation between the re-stored second portion of the input data and the weights.

The target operation may include a convolution operation performed in a neural network executed in the accelerator.

The performing of the target operation may include performing the target operation in a multi-operand multiplier-accumulator (MAC) to which the portion of the input data stored in the same word and the weights of the filter are input.

The accelerator may be included in a user terminal to which data to be inferred through a neural network in which the target operation is performed is input, or a server receiving the data to be inferred from the user terminal.

In another general aspect, an accelerator configured to perform a target operation includes a memory configured to store input data packed with a data layout determined based on a word width of the memory and a spatial size of a filter to be applied to the target operation, and an operator configured to perform the target operation between a portion of the input data stored in a same word in the memory and weights of the filter.

In still another general aspect, an electronic device includes a host processor configured to generate an instruction executable by an accelerator in response to a request for processing, in the accelerator, a neural network in which a target operation is performed, and the accelerator configured to, when the instruction is executed, pack input data with a data layer determined based on a word width of an internal memory and a spatial size of a filter to be applied to the target operation and store the packed input data in the internal memory, and perform the target operation between a portion of the input data stored in a same word in the internal memory and weights of the filter.

In still another general aspect, an accelerator configured to perform a target operation includes an input memory configured to pack input data into one word according to a data layout; a filter memory configured to store weights of a filter applied to the target operation; an operator including a plurality of multipliers configured to perform the target operation between the packed input data stored in a same word in the input memory and one or more of the weights stored in the filter memory; and a multiplexer selectively disposed between the operator and one of the input memory and the filter memory. In a case in which the multiplexer is disposed between the operator and the filter memory, the multiplexer is configured to selectively transfer one of the weights stored in the filter memory to each of the multipliers of the operator. In a case in which the multiplexer is disposed between the operator and the input register, the multiplexer is configured to selectively transfer one set of the packed input data stored in the input memory to each of the multipliers of the operator.

The accelerator may include an input register to which the packed input data stored in the same word in the input memory is fetched; and a filter register to which the weights of the filter are fetched. In the case in which the multiplexer is disposed between the operator and the filter memory, the multiplexer may be selectively disposed between the filter register and one of the filter memory and the operator. In the case in which the multiplexer is disposed between the operator and the input memory, the multiplexer may be selectively disposed between the input register and one of the input memory and the operator.

Other features and aspects will be apparent from the following detailed description, the drawings, and the claims.

Figure 1:
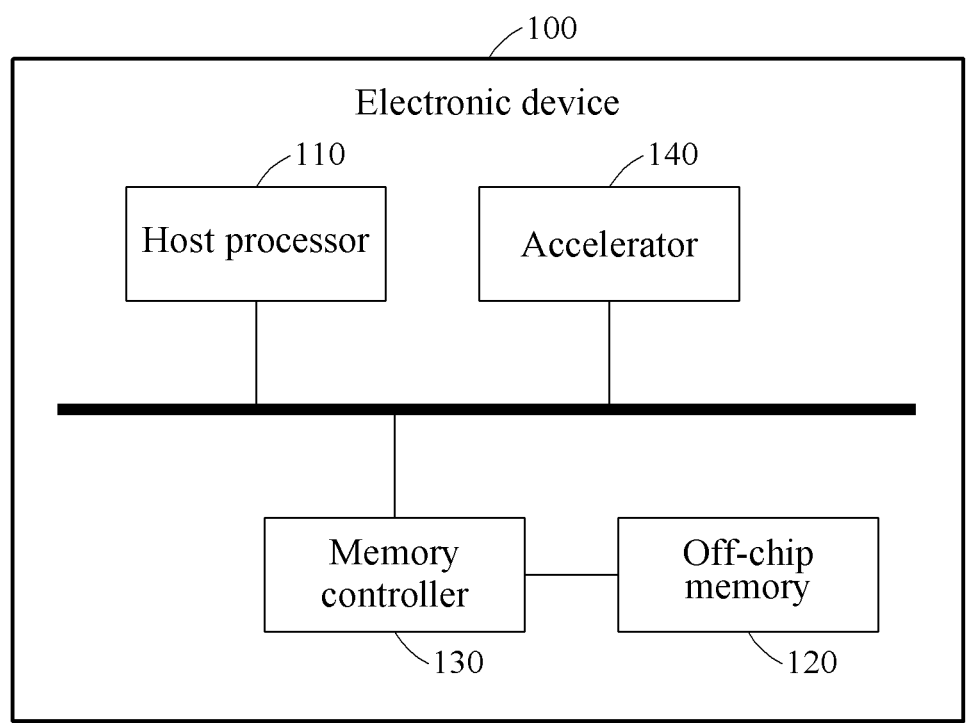
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an electronic device.

Referring to FIG. 1, an electronic device 100 includes a host processor 110, an off-chip memory 120, a memory controller 130, and an accelerator 140. The host processor 110, the off-chip memory 120, the memory controller 130, and the accelerator 140 may communicate with one another through a bus.

The host processor 110 may be a device configured to control respective operations of the components included in the electronic device 100 and may include a central processing unit (CPU), for example. The host processor 110 may receive a request for processing a neural network in the accelerator 140 and generate an instruction executable in the accelerator 140 in response to the received request. The request may be made for neural network-based data inference, and for obtaining a result of the data inference by allowing the accelerator 140 to execute the neural network for object recognition, pattern recognition, computer vision, speech recognition, machine translation, machine interpretation, or the like. The host processor 110 may transfer, to the accelerator 140, inference target data and parameters of the neural network.

The off-chip memory 120 may be a memory disposed outside the accelerator 140 and include, for example, a dynamic random-access memory (DRAM) used as a main memory of the electronic device 100. The off-chip memory 120 may be accessible through the memory controller 130. The off-chip memory 120 may store the inference target data and/or the parameters of the neural network to be executed in the accelerator 140, and data stored in the off-chip memory 120 may be transferred to the accelerator 140 for inference. In addition, the off-chip memory 120 may be used in a case in which an on-chip memory inside the accelerator 140 is not sufficient to execute the neural network in the accelerator 140.

The accelerator 140 may be an artificial intelligence (AI) accelerator configured to execute the neural network according to an instruction of the host processor 110 and infer data to be input, and be a separate processor distinguished from the host processor 110. The accelerator 140 may be, for example, a neural processing unit (NPU), a graphics processing unit (GPU), a tensor processing unit (TPU), and the like.

The accelerator 140 may process a task that is more effectively processed by a separate dedicated processor, for example, the accelerator 140, than by the host processor 110 used for general purposes based on the characteristics of operations of the neural network. Here, one or more processing elements (PEs) and the on-chip memory that are included in the accelerator 140 may be used. The on-chip memory may be a global buffer included in the accelerator 140 and be distinguished from the off-chip memory 120 disposed outside the accelerator 140. The on-chip memory may be, for example, a scratchpad memory accessible through an address space, a static random-access memory (SRAM), and the like.

The neural network may include a plurality of layers. In an example, the neural network may include an input layer, a plurality of hidden layers, and an output layer. Each of the layers may include a plurality of nodes each referred to as an artificial neuron. Each of the nodes may indicate an operation or computation unit having at least one input and output, and the nodes may be connected to one another. A weight may be set for a connection between nodes and be adjusted or changed. The weight may determine the influence of a related data value on a final result by increasing, decreasing, or maintaining the data value. To each node included in the output layer, weighted inputs of nodes included in a previous layer may be input. A process in which weighted data is input from a layer to a subsequent layer of the layer may be referred to as propagation.

In the neural network, a convolution operation may be performed. The convolution operation may be performed to extract a feature of input data by applying a filter or a kernel to the input data. To more effectively perform the convolution operation based on an operation characteristic, a method is newly proposed. Hereinafter, examples will be described in detail with reference to the accompanying drawings.

Figure 2:
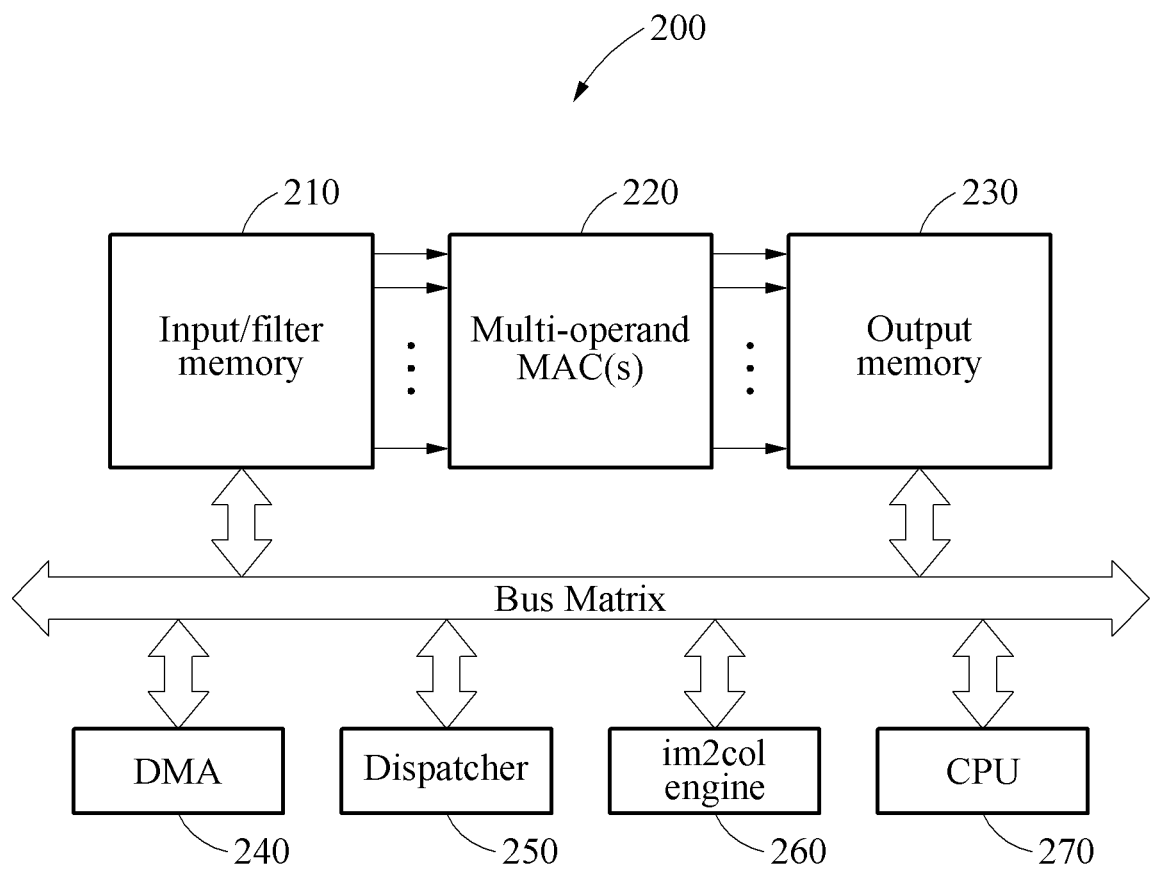
FIG. 2 illustrates an example of an accelerator.

FIG. 2 illustrates an example of an accelerator.

Referring to FIG. 2, an accelerator 200 includes an input/filter memory 210, a multi-operand multiplier-accumulator (MAC) 220, an output memory 230, a direct memory access (DMA) 240, a dispatcher 250, an im2col engine 260, and a CPU 270. Such internal elements of the accelerator 200 may communicate with one another through a bus.

The input/filter memory 210 may be an on-chip memory (e.g., an SRAM) inside the accelerator 200 and configured to store input data and filter weights. The multi-operand MAC 220 may perform a target operation (e.g., a convolution operation included in a neural network) on a plurality of operands from the input/filter memory 210. For example, the multi-operand MAC 220 may correspond to a PE in the accelerator 200 described above. The output memory 230 may be an on-chip memory (e.g., an SRAM) configured to store result data obtained as a result from an operation performed in the multi-operand MAC 220. The multi-operand MAC 220 may be also referred to herein as an operator for the convenience of description.

The DMA 240 may control data input and output of the input/filter memory 210 and/or the output memory 230. The dispatcher 250 may dispatch a target operation to control the target operation to be performed in the multi-operand MAC 220. The im2col engine 260 may transform two-dimensional (2D) image data into one-dimensional (1D) string data based on a preset spatial size and a stride size. By applying such an im2col transformation to input data, a same convolution operation result may be obtained even with a matrix product of input data obtained through the im2col transformation. In an example, the im2col transformation may be performed not only by the im2col engine 260 but also by various combinations of the DMA 240, the dispatcher 250, and the CPU 270. A spatial size and a stride size to which the im2col transformation is applied may be different from a filter to be applied to a convolution operation, which will be described in detail hereinafter.

Figure 3:
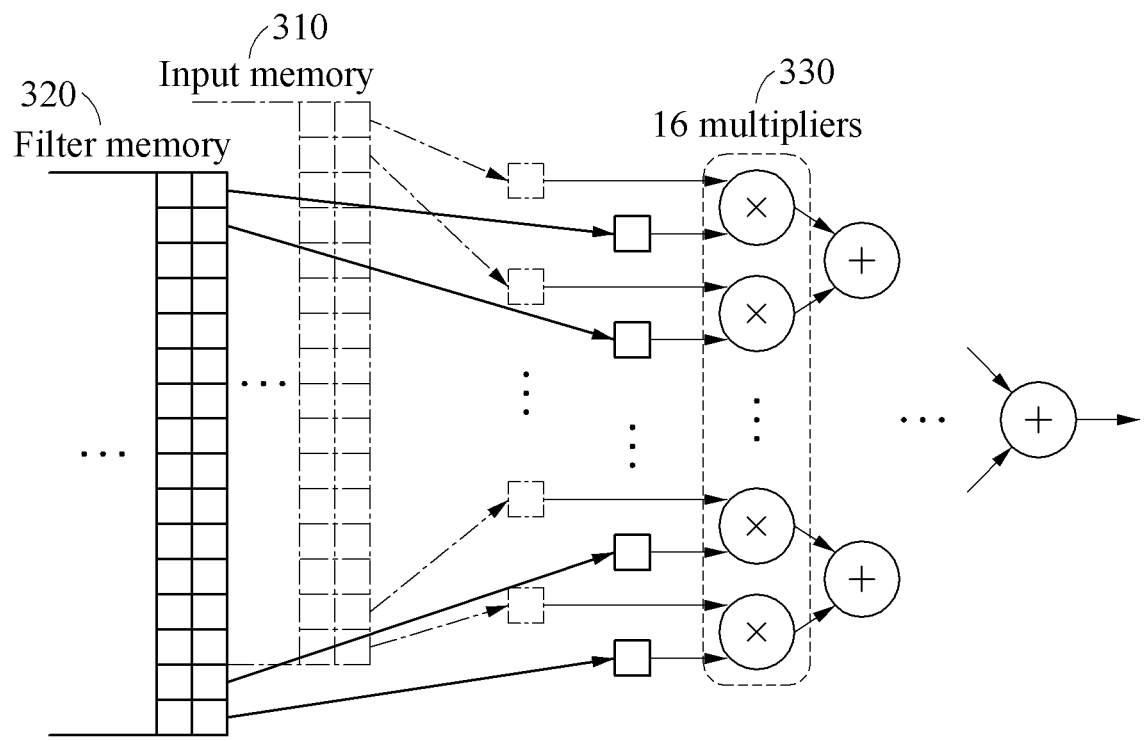
FIGS. 3 and 4 illustrate an example of an operator.
Figure 4:
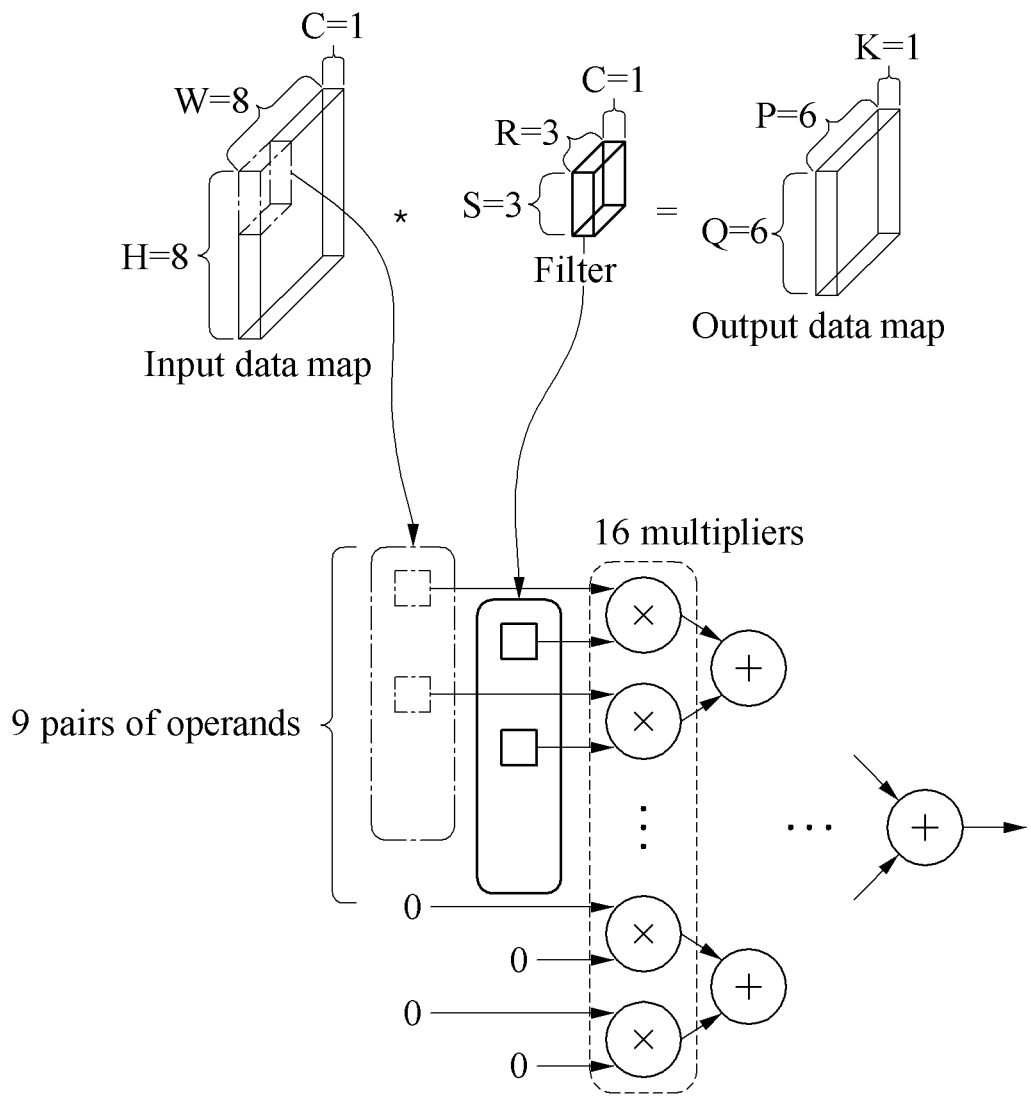

FIGS. 3 and 4 illustrate an example of an operator.

Referring to FIG. 3, an operator 330 may include an adder tree-based multi-operand MAC which is a form of a multi-operand MAC. The operator 330 may perform a convolution operation using a plurality of multipliers. The convolution operation may be performed in a neural network and may also be referred to herein as a multiply-accumulate operation or an MAC operation. Filter weights used for the convolution operation may be included in parameters of the neural network.

The operator 330 may receive input data from an input memory 310 and receive filter weights from a filter memory 320. Each of the input memory 310 and the filter memory 320 may be designed to have a data throughput corresponding to a computational throughput. For example, one word of each of the input memory 310 and the filter memory 320 may store elements in the same number as the multipliers included in the operator 330. In the example of FIG. 3, the operator 330 includes 16 multipliers, and one word of each of the input memory 310 and the filter memory 320 may store 16 elements. In this example, one word of each of the input memory 310 and the filter memory 320 may be represented by one string. Here, corresponding input data and weight may be transferred from each of the input memory 310 and the filter memory 320 to a multiplier and then multiplied in the multiplier. Results of such multiplication performed as described in the foregoing may be added, and a convolution value may thus be determined. The operator 330 may have a computational throughput for performing a total of 16 multiplications at once.

Although it is illustrated in FIG. 3 for the convenience of description that the operator 330 includes the 16 multipliers and one word of each of the input memory 310 and the filter memory 320 includes the 16 elements, examples are not limited thereto and other various examples may be applied without a limit.

Referring to FIG. 4, an output data map may be determined based on a convolution operation between an input data map and a filter. The input data map may also be referred to herein as an input feature map or image data. Each input data included in the input data map may also be referred to herein as an input activation.

Using an im2col transformation described above, a convolution operation on sets of data successive in a channel direction of the input data map may be transformed into a convolution operation on sets of data successive in a spatial direction of the input data map, as illustrated in FIG. 4. In such a case, only a portion of a plurality of multipliers included in an operator may receive an operand pair. For example, only 9 of 16 multipliers included in an operator may perform an operation in one cycle, and thus the utilization of the operator may be reduced.

FIGS. 5 through 8 illustrate examples of packing input data with a data layout and storing the packed data in a memory.

Figure 5:
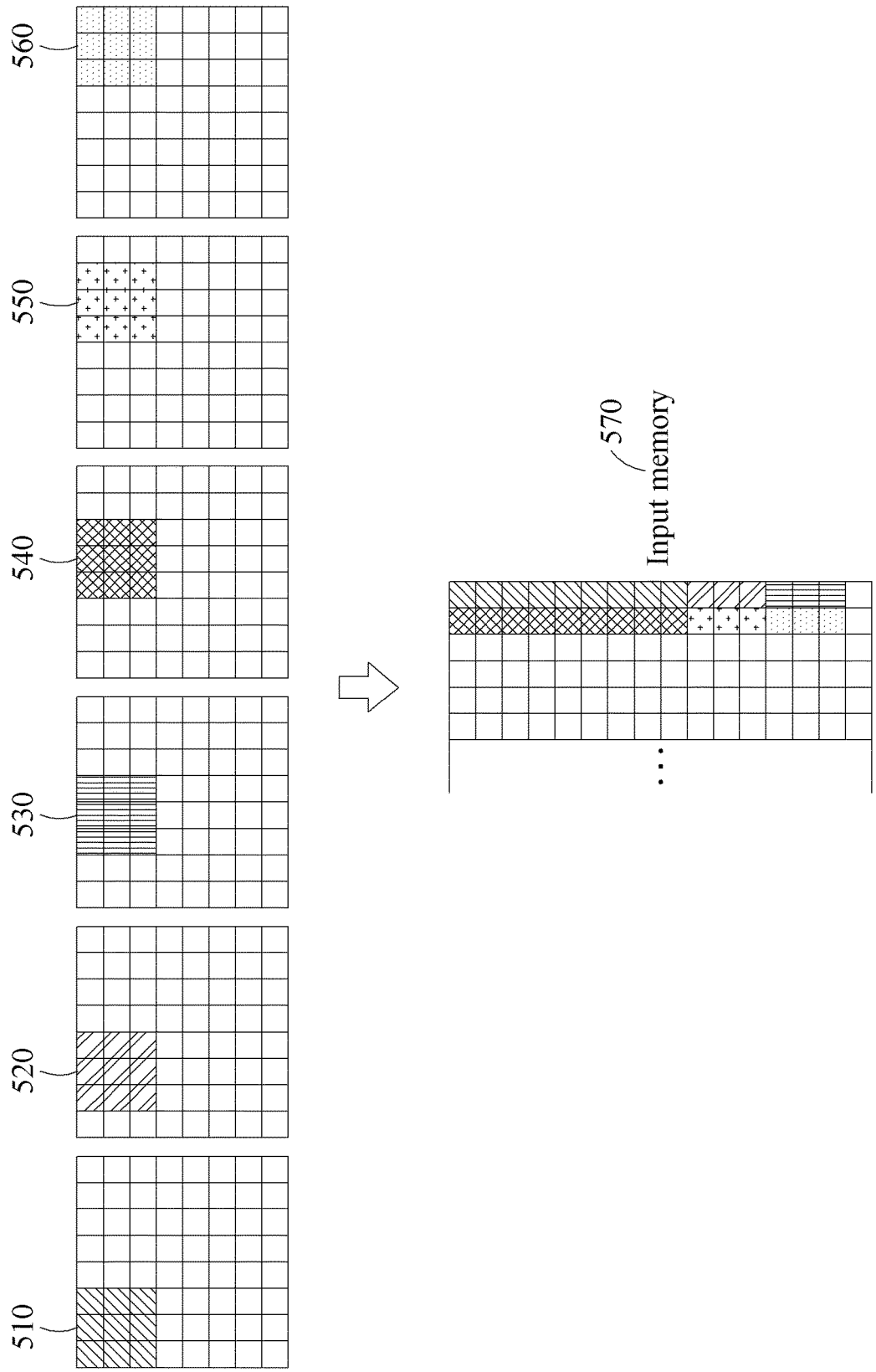
FIGS. 5, 6, 7, and 8 illustrate examples of packing input data with a data layout and storing the packed data in a memory.

Referring to FIG. 5, packing input data may improve a storage efficiency of a memory. For the convenience of description, it is assumed that, in a convolution operation, a filter to be applied to an input data map has a size of 3×3, and a stride size is 1. The input data map, the filter, and a size of an input memory 570 illustrated in FIG. 5 are provided merely as examples for the convenience of description, and thus other various examples may be applied thereto without a limit.

For example, first input data 510 in the input data map to which the filter is applied first may all be stored in a first word (or a first string on a right side) of the input memory 570. In addition, second input data 520 in the input data map to which the filter is applied secondly may include redundant data in which the second input data 520 and the first input data 510 overlap each other partially. Since the redundant data is already stored in the input memory 570, only data that does not overlap in the second input data 520 may be stored successively in the first word of the input memory 570. In addition, third input data 530 in the input data map to which the filter is applied thirdly may include redundant data in which the third input data 530 and the second input data 520 overlap each other partially. Similarly, since the redundant data is already stored in the input memory 570, only data that does not overlap in the third input data 530 may be stored successively in the first word of the input memory 570.

In the example, fourth input data 540 in the input data map to which the filter is applied fourthly may include redundant data in which the fourth input data 540 and the third input data 530 overlap each other partially. Here, the first word of the input memory 570 may not be sufficient to store data in the fourth input data 540 that does not overlap. Thus, the fourth input data 540 may all be stored in a second word (or a second string on the right side) of the input memory 570. Although the fourth input data 540 includes the redundant data overlapping a portion of the third input data 530, the fourth input data 540 may be stored in another word different one in which the third input data 530 is stored, and thus the fourth input data 540 may all be stored in the second word of the input memory 570. Similarly, for fifth input data 550 in the input data map to which the filter is applied fifthly and sixth input data 560 in the input data map to which the filter is applied sixthly, only data that does not overlap may be stored successively in the second word of the input memory 570.

As described above, a data layout may be determined such that redundant storage of input data is minimized, based on a word width of the input memory 570, that is, the number of elements included in one word (e.g., 16 in the example of FIG. 5), and on a spatial size of the filter (e.g., 9 in the example of FIG. 5). Thus, by packing input data corresponding to a plurality of filters and storing the packed input data in one word of the input memory 570, it is possible to minimize the number of elements in one word in which data is not stored, thereby improving considerably a storage efficiency of the input memory 570. In addition, only two words of the input memory 570 may be needed for six convolution operations, and thus a threefold memory efficiency may be expected, compared to six words needed when data needed for a single convolution operation is stored in one word.

Figure 6:
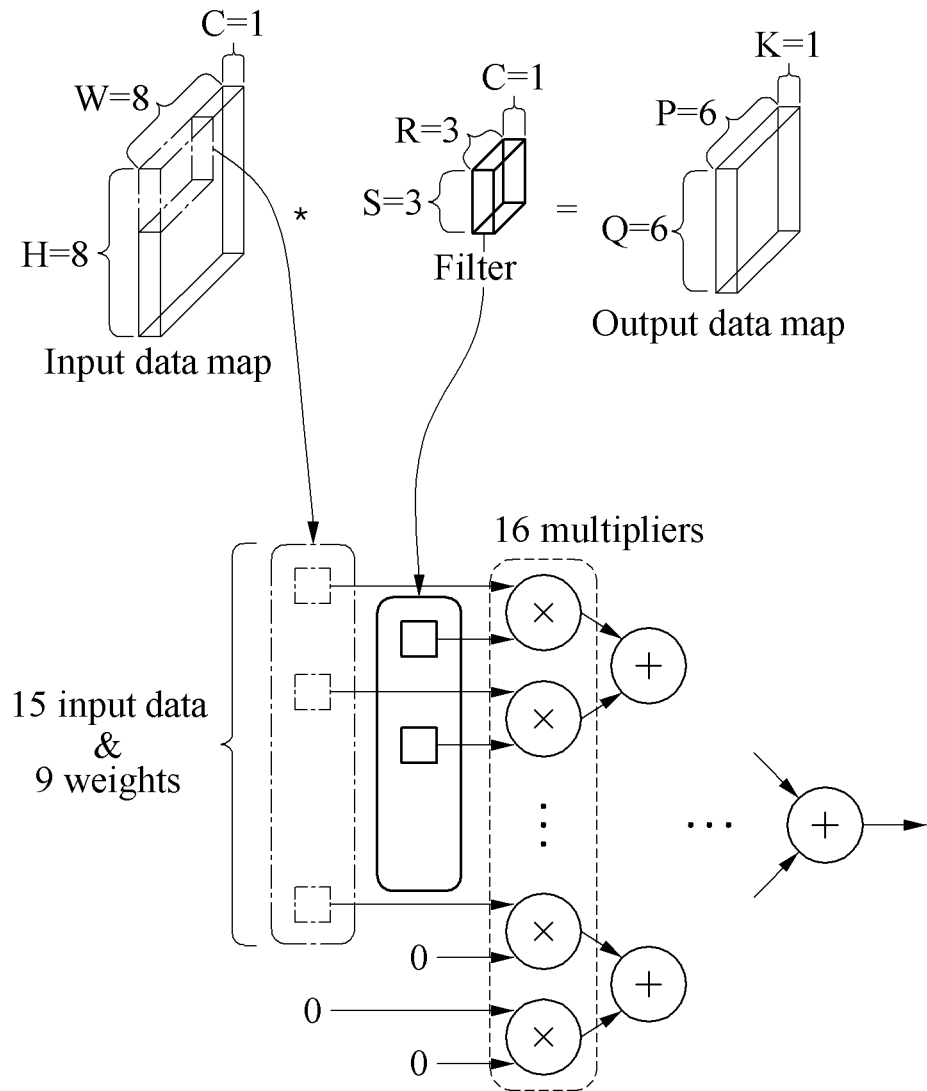

Referring to FIG. 6, a convolution operation may be performed through im2col transformation-based data packing. An input data map, a filter size, and the number of multipliers included in an operator illustrated in FIG. 6 may be provided merely as examples for the convenience of description, and thus examples are not limited thereto and other various examples may also be applied without a limit.

As described above, input data corresponding to a plurality of filters may be packed into one word and stored in an input memory. Such data packing may be readily implemented by adjusting a filter size to be applied to an im2col transformation. For example, the filter size to be applied to the im2col transformation may be determined to be a size obtained by adding the filters corresponding to the input data packed into one word. For example, in the example of FIG. 5, a filter size may be 3×3 and input data corresponding to three filters may be packed into one word. In the example of FIG. 6, a filter size to be applied to an im2col transformation may be determined to be 5×3. That is, dissimilar to a general square filter, a filter to be applied to the im2col transformation may be a rectangle that is long in a stride direction, for example, a direction in which a filter moves as a convolution operation is performed. Through such data packing, 15 sets of input data and 9 filter weights may be input to an operator in one cycle. A filter to be applied to an im2col transformation may also be referred to as a virtual filter to distinguish it from a filter applied to a convolution operation, based on the fact that it is not applied to an actual convolution operation.

Figure 7:
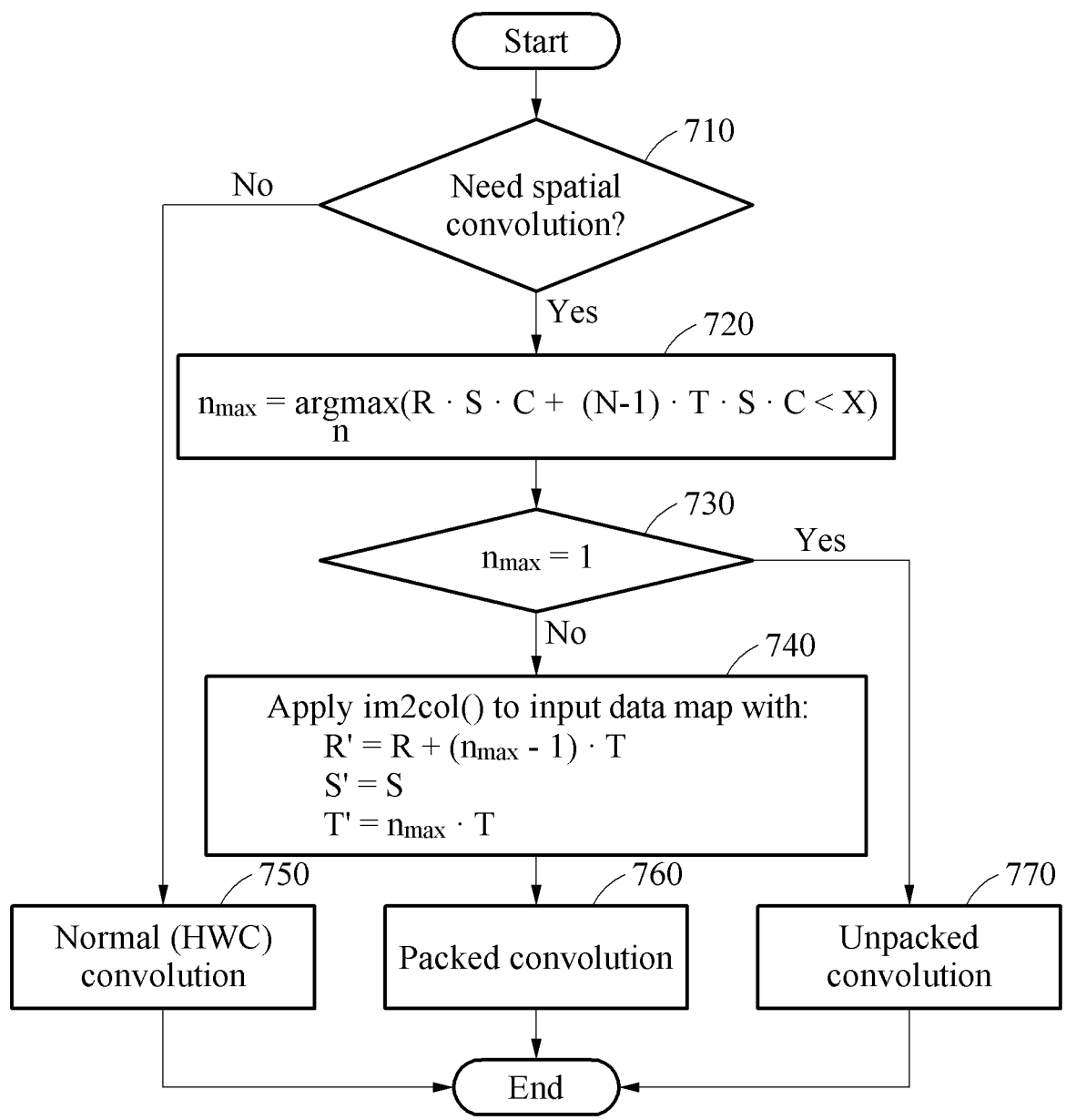

FIG. 7 illustrates a flowchart of an example of performing a convolution operation on input data.

Referring to FIG. 7, in operation 710, whether a spatial convolution operation needs to be performed is determined. For example, in a case in which the number of channels of an input data map and/or a filter is greater than a preset criterion, it may be determined that the spatial convolution operation does not need to be performed. In contrast, in a case in which the number of channels of the input data map and/or the filter is less than the preset criterion, a computational efficiency of a convolution operation in a channel direction may be reduced considerably, and thus it may be determined that the spatial convolution operation needs to be performed.

In response to the determination that the spatial convolution operation does not need to be performed, operation 750 may be performed and a normal height, width, channel (HWC) convolution operation may be performed. The HWC convolution operation refers to a convolution operation on sets of data successive in a channel direction of an input data map.

In response to the determination that the spatial convolution operation needs to be performed, operation 720 may be performed. In operation 720, a maximum number $n_{max}$ of filters corresponding to input data to be packed into one word is determined through the following equation.

$$n_{max} = \underset{n}{\mathrm{argmax}}(R \cdot S \cdot C + (n-1) \cdot T \cdot S \cdot C < X) \quad \text{[Equation 1]}$$

In Equation 1 above, R denotes a horizontal size of a filter, that is, an x-direction size. S denotes a vertical size of the filter, that is, a y-direction size. C denotes the number of channels of an input data map, and X denotes the number of operand pairs that are simultaneously processible by an operator. T denotes a stride size of the filter to be applied to a convolution operation. In the examples of FIGS. 5 and 6, since R=S=3, C=1, X=16, and T=1, $n_{max}$ may be determined to be 3 ($n_{max}$=3).

In operation 730, whether $n_{max}$ is 1 or not is determined. When $n_{max}$ is 1, operation 770 may be performed. Here, $n_{max}$ being 1 indicates packing input data corresponding to one filter into one word. However, data packing may not practically occur, and thus an unpacking convolution operation may be performed, as described above with reference to FIG. 4.

In contrast, when $n_{max}$ is not 1, operation 740 may be performed. In operation 740, a virtual filter to be applied to an im2col transformation is determined through the following equation, and the im2col transformation is performed on the input data map. Thus, the input data is packed and stored in an input memory.

$R'=R+(n_{max}-1) \cdot T$ $S'=S$ $T'=n_{max} \cdot T$ [Equation 2]

In Equation 2 above, R' denotes a horizontal size of a virtual filter to be applied to im2col, and S' denotes a vertical size of the virtual filter to be applied to im2col. T' denotes a stride size of the virtual filter to be applied to im2col. In the examples of FIGS. 5 and 6, R' may be determined to be 5 (R'=5), S' to be 3 (S'=3), and T' to be 3 (T'=3).

In operation 760, a convolution operation between the packed input data and weights of the filter is performed. This convolution operation may also be referred to herein as a packed convolution, which will be described in detail with reference to FIGS. 9 through 21.

Figure 8:
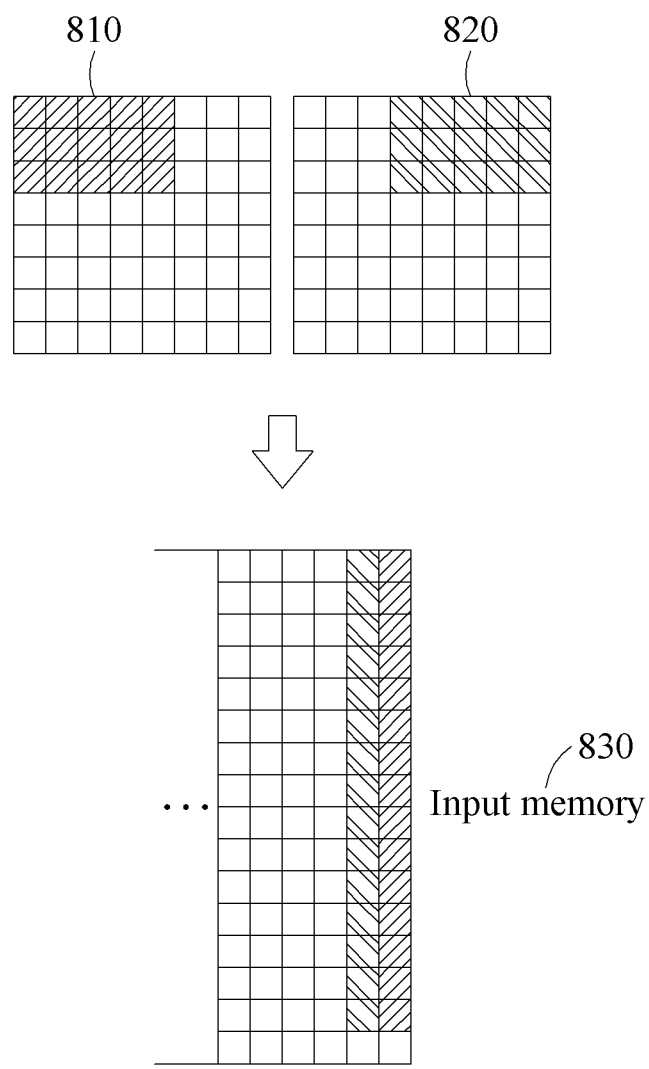

Referring to FIG. 8, an im2col transformation may be performed based on a spatial size of a virtual filter and a stride size to pack input data and store the packed input data in an input memory 830.

In the example of FIG. 8, the spatial size of the virtual filter is determined to be 5×3, and the stride is determined to be 3. For example, first input data 810 to which the virtual filter is applied first may all be stored in a first word (e.g., a first string on a right side) of the input memory 830. In addition, second input data 820 to which the virtual filter is applied secondly may all be stored in a second word (e.g., a second string on the right side) of the input memory 830.

As described above, packing of input data may be simply implemented through a virtual filter-based im2col transformation.

Although not illustrated in FIG. 8, the virtual filter-based im2col transformation described above may be performed on input data, and thus a general im2col transformation may be performed on weights of a filter. Since the filter has a size of 3×3, 9 weights in a filter memory may be stored in one word.

Although an example of input data packing in an x direction is mainly described above, examples are not limited thereto. The foregoing description is also applicable to input data packing in a y direction.

FIGS. 9 through 21 illustrate examples of performing a target operation.

Figure 9:
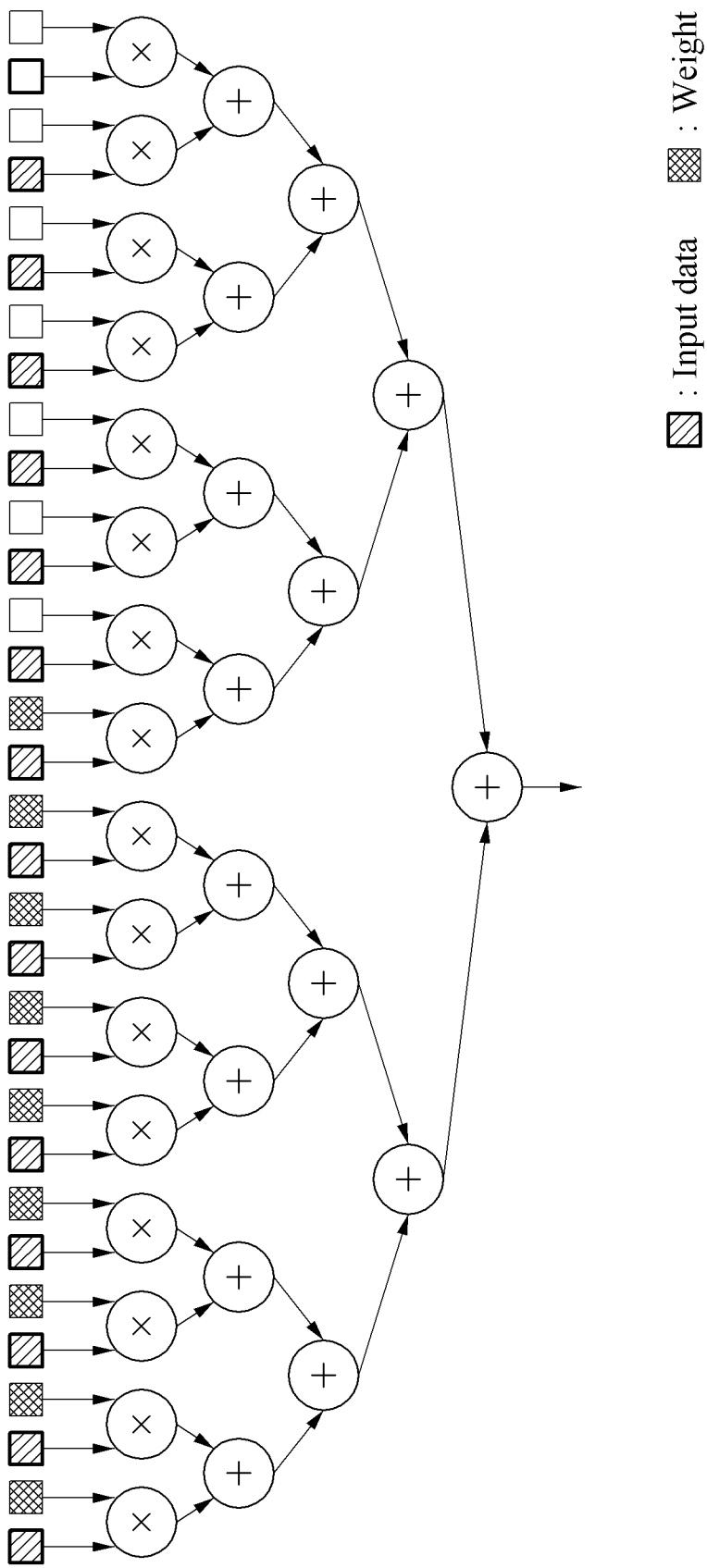
FIGS. 9, 10, 11, 12, 13, 14, 15, 16, 17, 18, 19, 20, and 21 illustrate examples of performing a target operation.

Referring to FIG. 9, a target operation, or a convolution operation, may be performed using a data layout described herein. To perform the convolution operation, input data stored in an input memory may be fetched, in a word unit, to an input register. When a preset number of convolution operations is performed on the input data fetched to the input register, input data stored in a subsequent word in the input memory may be fetched to the input register. Filter weights to be applied to a convolution operation may be fetched to a filter register. In the example of FIG. 9, each box connected to a multiplier of an operator may indicate an element included in the input register or the filter register, a filled box may indicate valid data being stored, and a blank box may indicate 0 being stored. The operator of FIG. 9 may include an adder tree-based multi-operand MAC.

Figure 14:
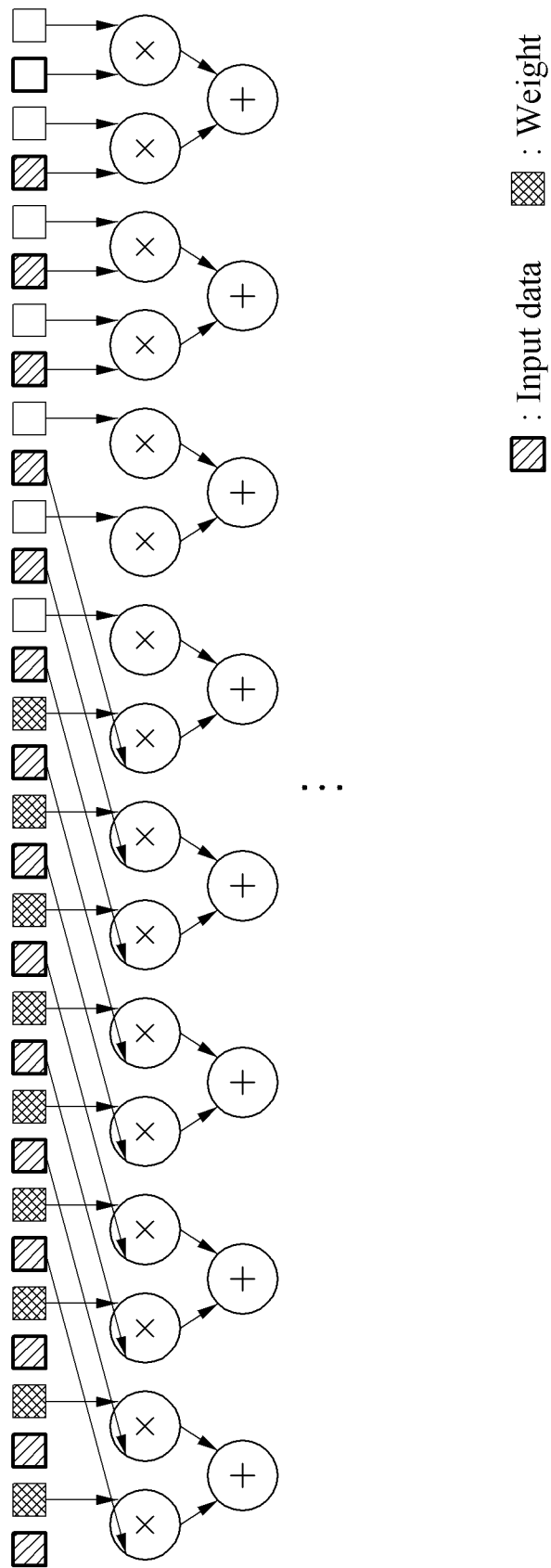
Figure 15:
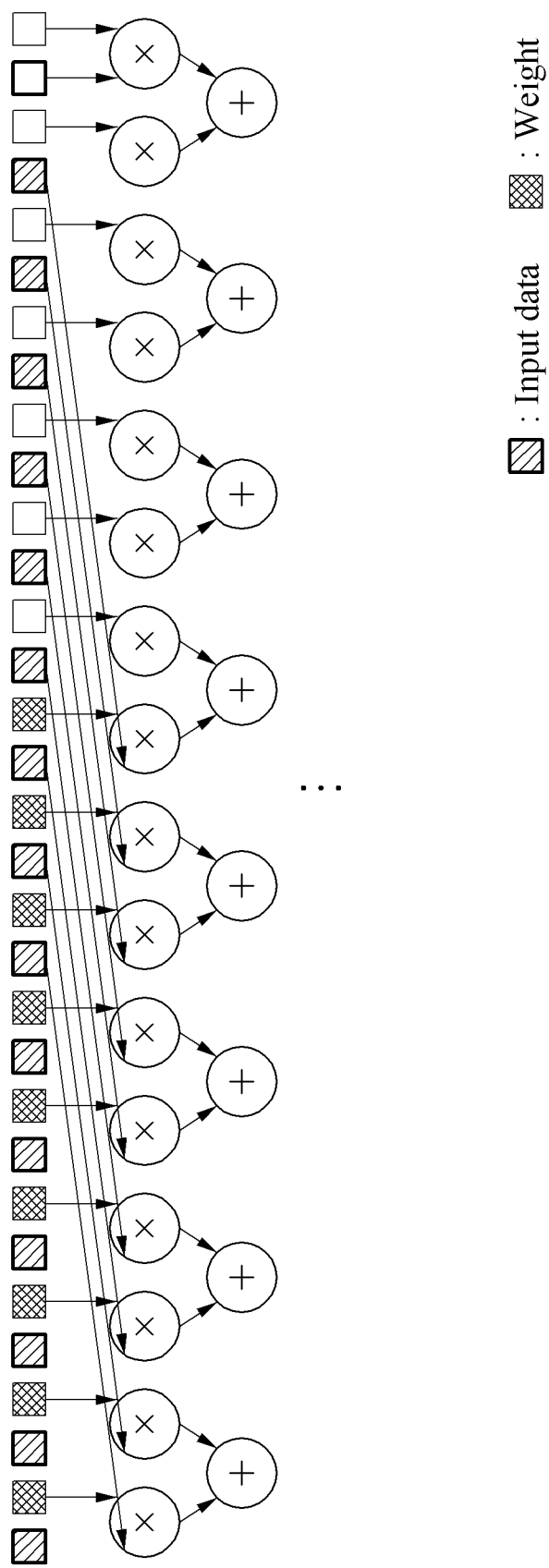

As illustrated in FIG. 9, 15 sets of input data may be stored in the input register, and 9 weights may be stored in the filter register. A convolution operation between a portion of the 15 sets of input data stored in the input register and the weights may be performed. That is, a first convolution operation may be performed by multiplying, by a corresponding weight, each of first 9 sets of input data among the 15 sets of input data stored in the input register, and then by adding multiplication results from such a multiplication. A second convolution operation may be performed based on another portion of the 15 sets of input data stored in the input register, which will be described in detail with reference to FIGS. 10 through 21. As described above, by once fetching, to an input register, input data packed in a same word in an input memory, it is possible to perform a plurality of convolution operations, and thus improve data reutilization based on a characteristic of a convolution operation and increase a memory efficiency.

Figure 10:
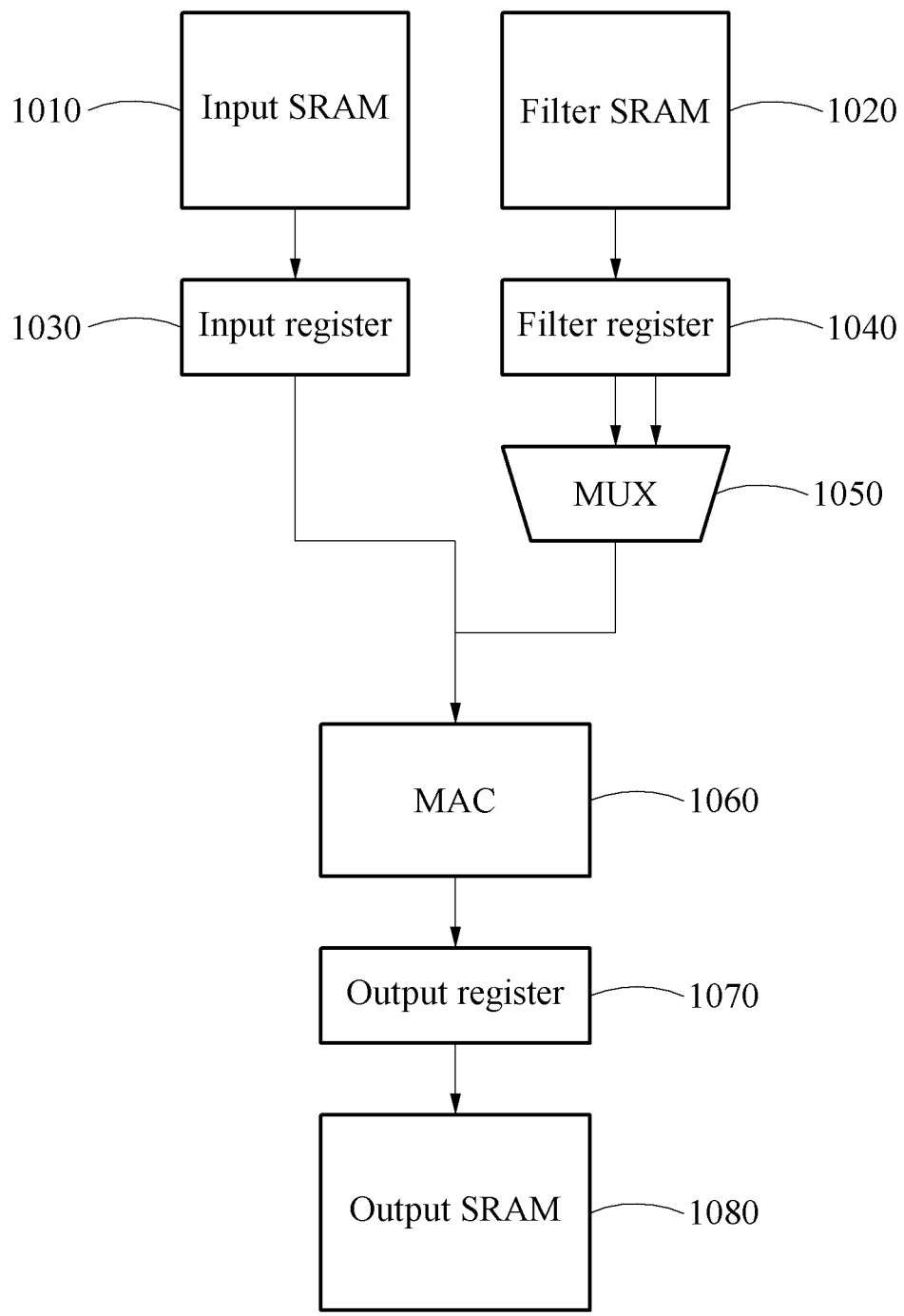

FIG. 10 illustrates an example of an accelerator configured to perform a convolution operation using a data layout. Referring to FIG. 10, an accelerator includes an input SRAM 1010, a filter SRAM 1020, an input register 1030, a filter register 1040, a multiplexer (MUX) 1050, an MAC 1060, an output register 1070, and an output SRAM 1080.

The input SRAM 1010 may pack input data corresponding to a plurality of filters into one word according to a data layout, and store the packed input data. The input register 1030 may store the input data fetched, in a word unit, from the input SRAM 1010 for performing a convolution operation.

The filter SRAM 1020 may store weights of a filter applied to the convolution operation. The filter register 1040 may store the stored weights fetched from the filter SRAM 1020.

The MUX 1050, which is configured to select one of sets of data and transfer the selected set of data, may be disposed between the filter register 1040 and the MAC 1060, and selectively transfer one of the weights stored in the filter register 1040 to each of multipliers receiving weights as an input. Through the MUX 1050, it is possible to perform a plurality of convolution operations even though the input data packed into one word is fetched to the input register 1030 just one time. Such a structure is referred to herein as a weight muxing structure for the convenience of description.

The MAC 1060 may perform a convolution operation between a portion of the input data stored in the input register 1030 and a weight muxed from the MUX 1050. The output register 1070 may temporarily store an operation result of the MAC 1060, and the output SRAM 1080 may receive the operation result from the output register 1070 and store the received operation result in an appropriate address.

Figure 11:
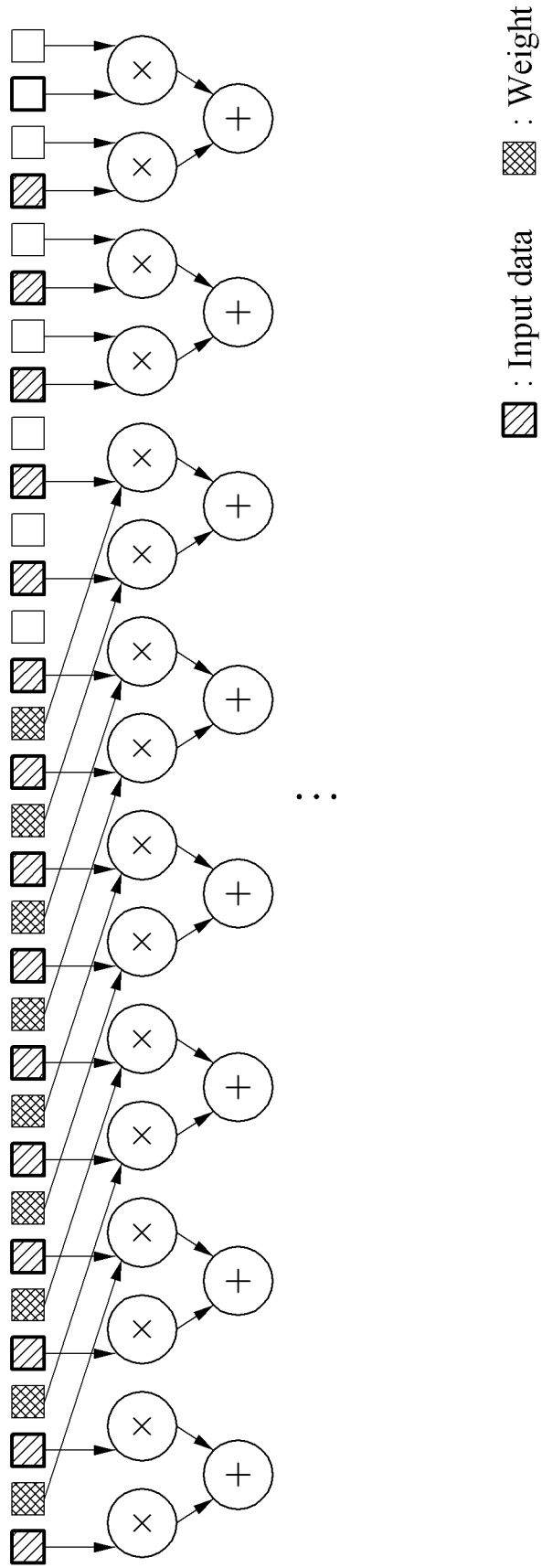

FIG. 11 illustrates an example of a convolution operation performed in a weight muxing structure in a cycle after an operation described above with reference to FIG. 9 is performed. After the convolution operation described above with reference to FIG. 9, each weight may be muxed to be input to a multiplier separated by a preset number (e.g., a horizontal or vertical size of a filter). Through this, it is possible to change input data to be applied to a filter, and it is thus possible to simply implement a second convolution operation corresponding to, for example, the second input data 520 of FIG. 5. In the example of FIG. 11, a MUX is omitted for the convenience of description, and inputting 0 in lieu of a weight to first through third multipliers of an operator (e.g., first through third multipliers from a left side of FIG. 11) is also omitted.

Figure 12:
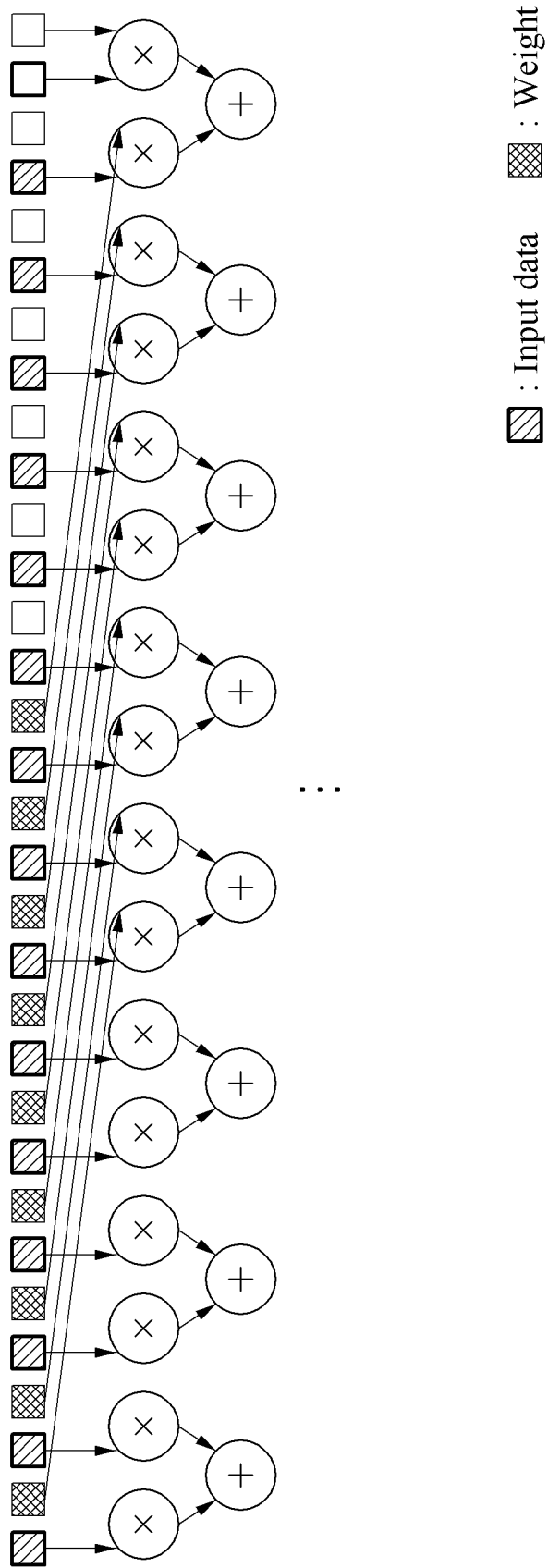

FIG. 12 illustrates an example of a convolution operation performed in a weight muxing structure in a cycle after an operation described above with reference to FIG. 11 is performed. After the convolution operation described above with reference to FIG. 11, each weight may be muxed to be input to a multiplier separated by a preset number. Through this, it is possible to change input data to be applied to a filter, and it is thus possible to simply implement a third convolution operation corresponding to, for example, the third input data 530 of FIG. 5. As described above, by performing a plurality of convolution operations by varying a portion of input data after fetching, to an input register, input data packed into one word, it is possible to maximize a memory efficiency through data reutilization.

Figure 13:
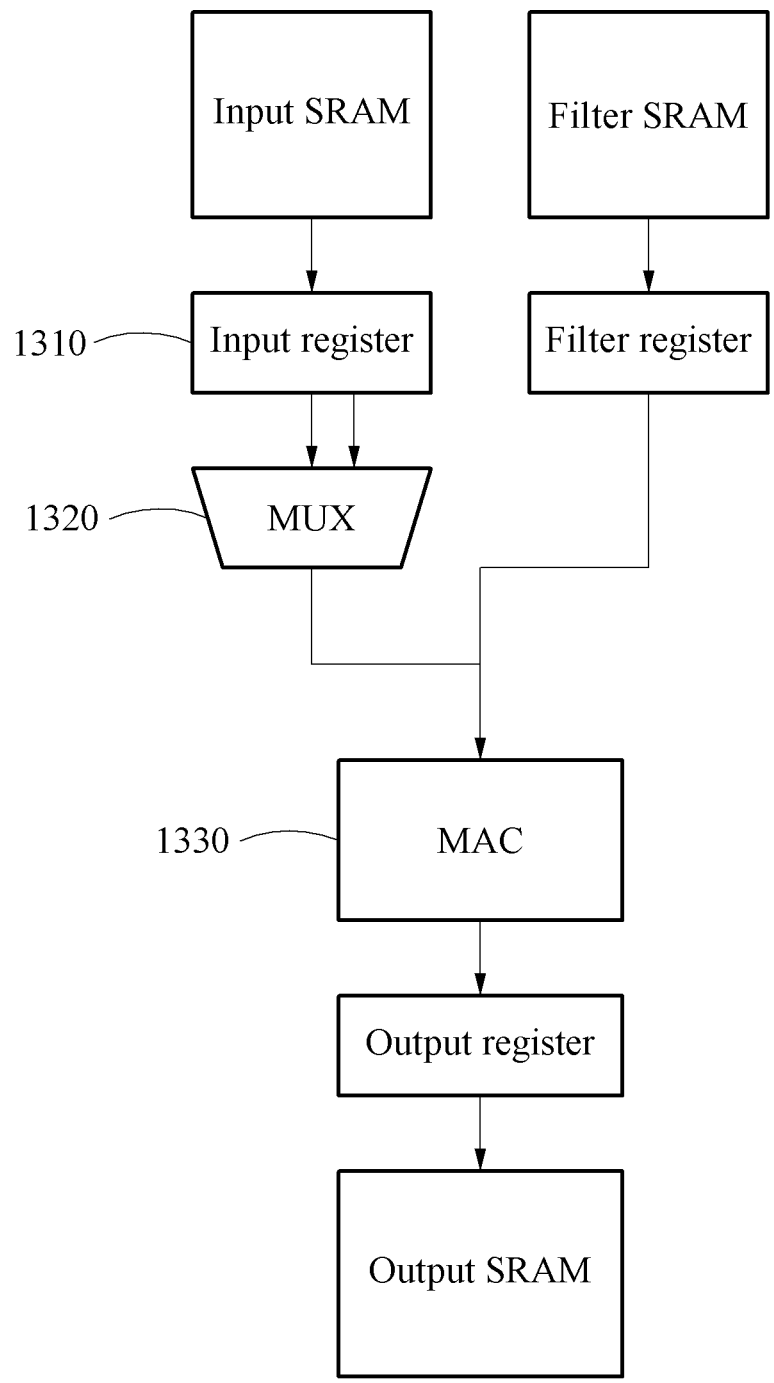

FIG. 13 illustrates another example of an accelerator configured to perform a convolution operation using a data layout. In the example of FIG. 13, dissimilar to what is described above with reference to FIG. 10, a MUX 1320 may be disposed between an input register 1310 and a MAC 1330, and selectively transfer one of sets of input data stored in the input register 1310 to each of multipliers receiving a weight from the filter register. Such a structure is referred to herein as an input data muxing structure for the convenience of description. The MAC 1330 may perform a convolution operation between a portion of the input data stored in the input register 1310 or a muxed portion, and weights stored in a filter register.

FIG. 14 illustrates an example of a convolution operation performed in an input data muxing structure in a cycle after an operation described above with reference to FIG. 9 is performed. After a convolution operation is performed on a first portion (e.g., 1st through 9th input data) of input data in the example of FIG. 9, a second portion (e.g., 4th through 12th input data) of the input data may be muxed to be input to a preset multiplier. Here, the preset multiplier may include first through ninth multipliers to which weights are to be input. Through this, it is possible to change input data to be applied to a filter, and it is thus possible to simply implement a second convolution operation corresponding to, for example, the second input data 520 of FIG. 5. In the example of FIG. 14, a MUX is omitted for the convenience of description, and inputting 0 in lieu of input data to 10th to 12th multipliers of an operator (e.g., 10th to 12th multipliers from a left side of FIG. 14) is also omitted.

FIG. 15 illustrates an example of a convolution operation performed in an input data muxing structure in a cycle after an operation described above with reference to FIG. 14 is performed. After a convolution operation is performed on a second portion of input data in the example of FIG. 14, a third portion (e.g., 7th to 15th input data) of the input data may be muxed to be input to a preset multiplier. Through this, it is possible to change input data to be applied to a filter, and it is thus possible to simply implement a third convolution operation corresponding to, for example, the input data 530 of FIG. 5.

Figure 16:
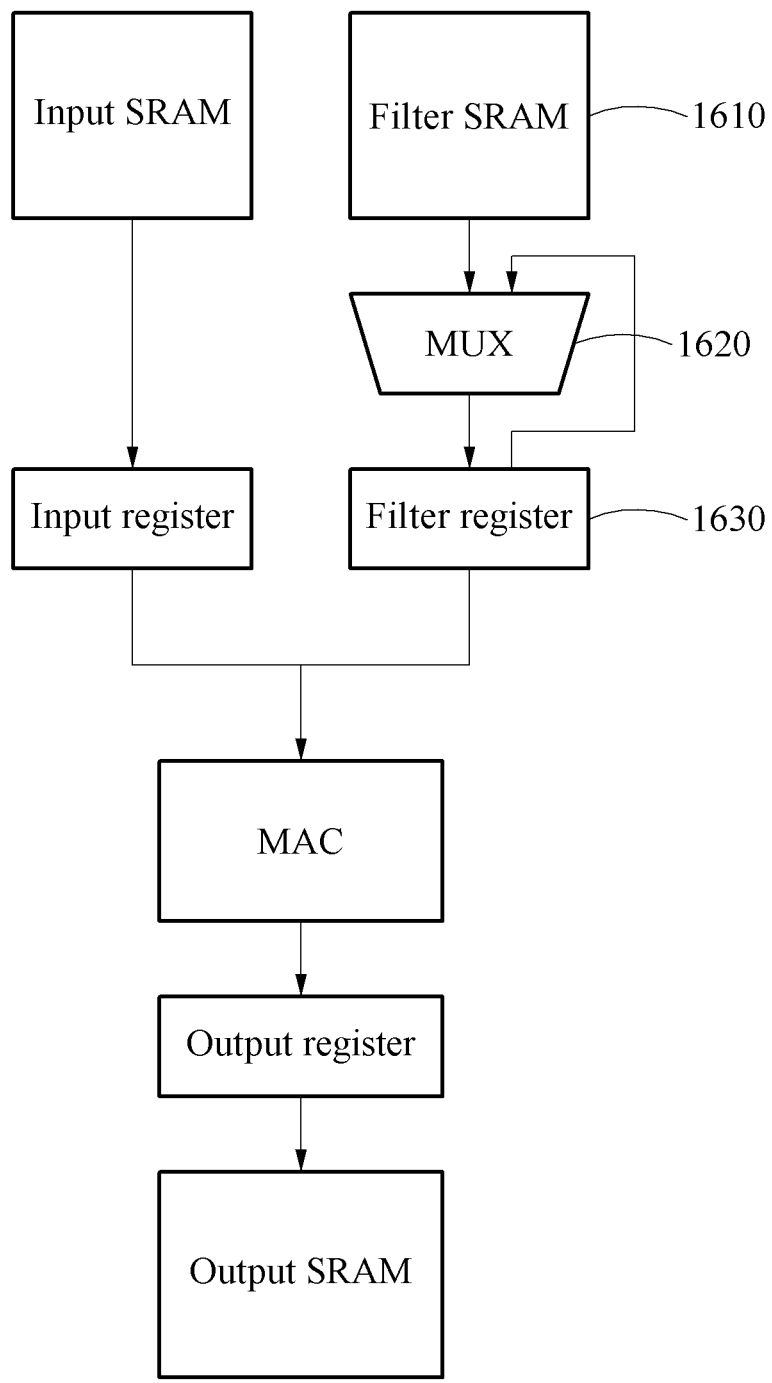

FIG. 16 illustrates still another example of an accelerator configured to perform a convolution operation using a data layout. In the example of FIG. 16, dissimilar to what is described above with reference to FIG. 10, a MUX 1620 may be disposed between a filter SRAM 1610 and a filter register 1630, and selectively transfer, to each of elements storing a weight in the filter register 1630, one of a weight stored in the filter SRAM 1610 and a weight stored in the filter register 1630. Through this, an order of weights stored in the filter register 1630 may be changed, and then be stored again in the filter register 1630. Such a structure is referred to herein as a weight shifting structure for the convenience of description.

Compared to the weight muxing structure illustrated in FIG. 10, there is a difference in positions of the MUXs 1050 and 1620. In the weight muxing structure illustrated in FIG. 10, the MUX 1050 is directly connected to the MAC 1060. However, in the weight shifting structure, the MUX 1620 may have a structural difference in that a critical path is directly connected to a small SRAM. Thus, the weight shifting structure may have a smaller power consumption and occupy a less physical area, compared to the weight muxing structure. Although the weight shifting structure is described in comparison to the weight muxing structure for the convenience of description, the description is also applicable to a comparison between an input data muxing structure and an input data shifting structure.

Figure 17:
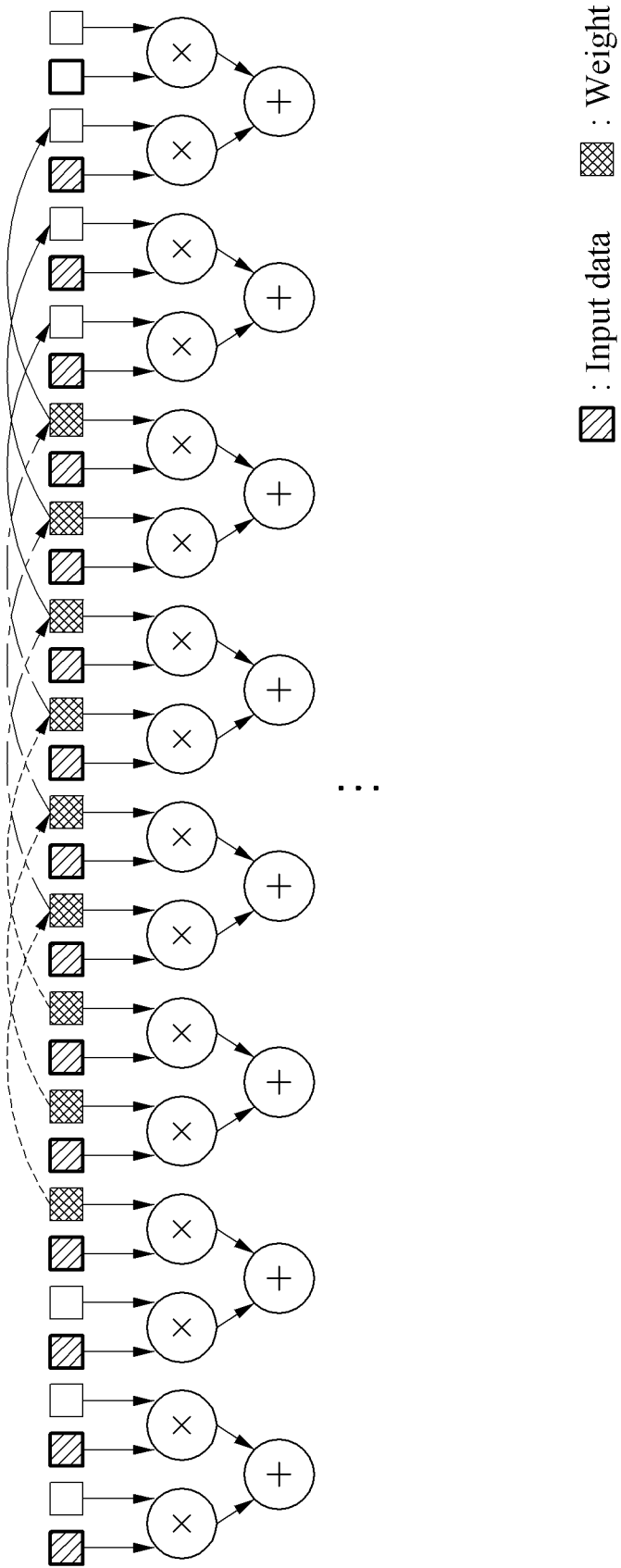

FIG. 17 illustrates an example of a convolution operation performed in a weight shifting structure in a cycle after an operation described above with reference to FIG. 9 is performed. After the convolution operation of FIG. 9, each weight may be muxed to be input to a multiplier separated by a preset number (e.g., a horizontal or vertical size of a filter) and re-stored in a filter register. Each of elements of the filter register illustrated in FIG. 17 may include weights re-stored in the filter register after being muxed. Through this, it is possible to change input data to be applied to a filter, and it is thus possible to simply implement a second convolution operation corresponding to, for example, the second input data 520 of FIG. 5. In the example of FIG. 17, arrows connecting the elements of the filter register indicate that, after the convolution operation of FIG. 17 is completed, weights are shifted through muxing. In the example of FIG. 17, a MUX is omitted for the convenience of description.

Figure 18:
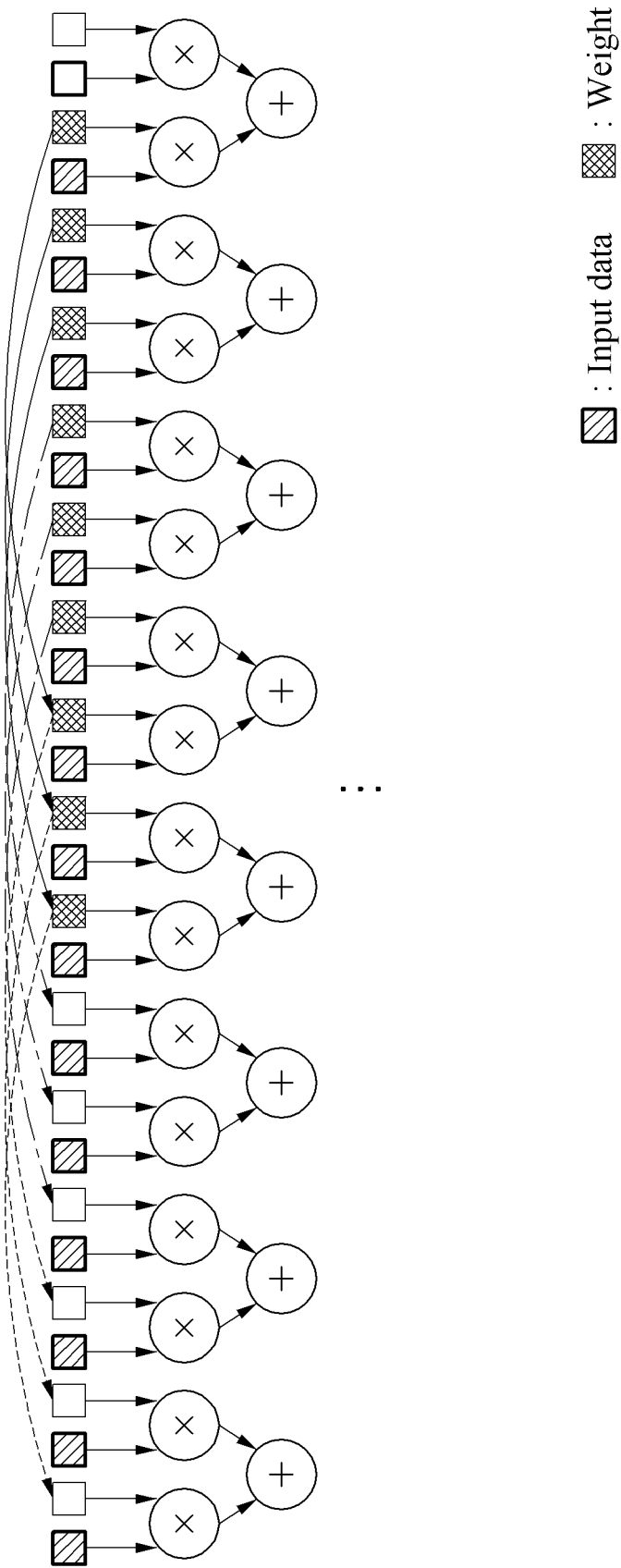

FIG. 18 illustrates an example of a convolution operation performed in a weight shifting structure in a cycle after an operation described above with reference to FIG. 17 is performed. After the convolution operation of FIG. 17, each weight may be muxed to be input to a multiplier separated by a preset number and re-stored in a filter register. Each of elements of the filter register illustrated in FIG. 18 may include weights re-stored in the filter register after being muxed. Through this, it is possible to change input data to be applied to a filter, and it is thus possible to simply implement a third convolution operation corresponding to, for example, the third input data 530 of FIG. 5. In the example of FIG. 18, arrows connecting the elements of the filter register may indicate, after the convolution operation of FIG. 18 is completed, weights are shifted through muxing.

Figure 19:
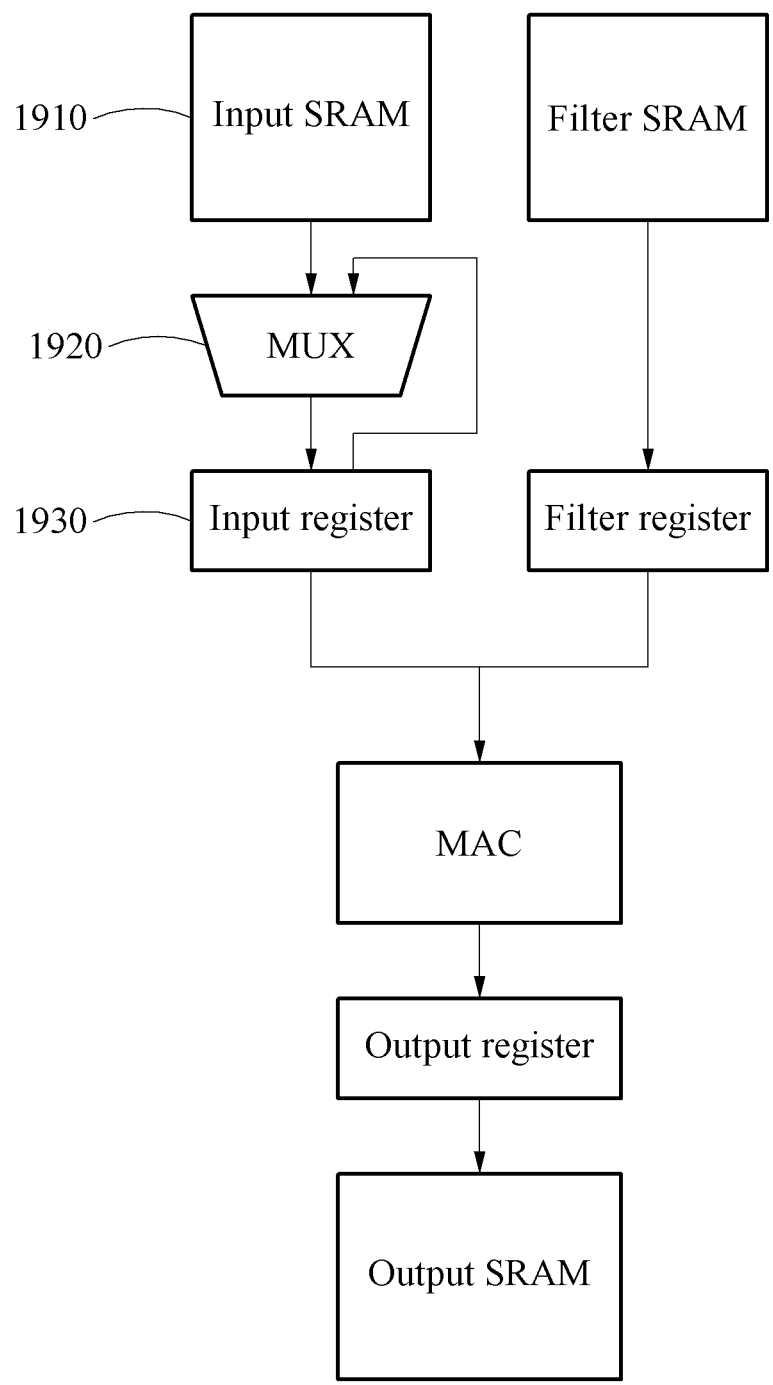

FIG. 19 illustrates yet another example of an accelerator configured to perform a convolution operation using a data layout. In the example of FIG. 19, dissimilar to what is described above with reference to FIG. 10, a MUX 1920 may be disposed between an input SRAM 1910 and an input register 1930, and selectively transfer one of input data stored in the input SRAM 1910 and input data stored in the input register 1930 to each of elements storing input data in the input register 1930. Through this, an order of the input data stored in the input register 1930 may be changed and then stored back in the input register 1930. Such a structure is referred to herein as an input data shifting structure for the convenience of description.

Figure 20:
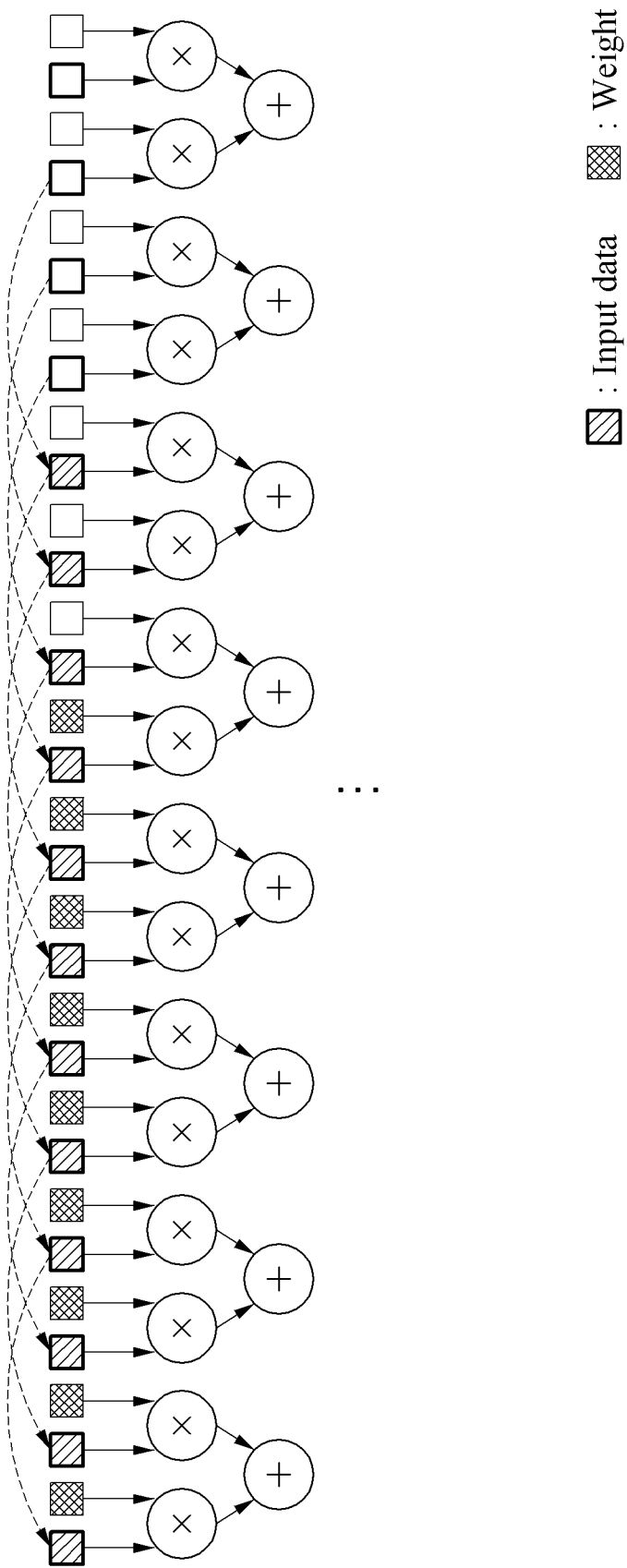

FIG. 20 illustrates an example of a convolution operation performed in an input data shifting structure in a cycle after an operation described above with reference to FIG. 9 is performed. After a convolution operation is performed on a first portion of input data in the example of FIG. 9, a second portion of the input data may be muxed to be input to a preset multiplier and re-stored in an input register. In the example of FIG. 20, arrows connecting elements of the input register may indicate, after the convolution operation of FIG. 9 is completed, weights are shifted through muxing. In the example of FIG. 20, each of the elements of the input register may include input data re-stored in the input register after being muxed. Through this, it is possible to change input data to be applied to a filter, and it is thus possible to simply implement a second convolution operation corresponding to, for example, the second input data 520 of FIG. 5. In the example of FIG. 20, a MUX is omitted for the convenience of description.

Figure 21:
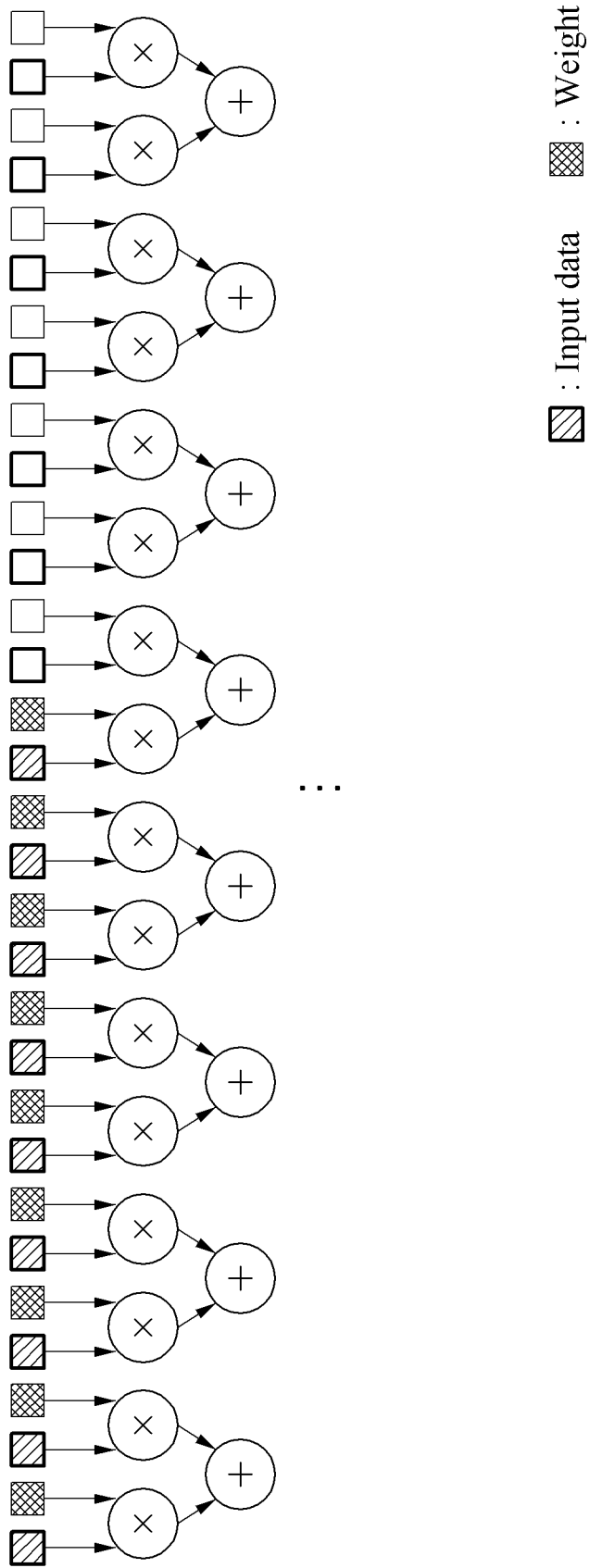

FIG. 21 illustrates an example of a convolution operation in an input data shifting structure in a cycle after an operation described above with reference to FIG. 20 is performed. After a convolution operation is performed on a second portion of input data in the example of FIG. 20, a third portion of the input data may be muxed to be input to a preset multiplier and re-stored in an input register. Each of elements of the input register illustrated in FIG. 20 may include input data re-stored in the input register after being muxed. Through this, it is possible to change input data to be applied to a filter, and it is thus possible to simply implement a third convolution operation corresponding to, for example, the third input data 530 of FIG. 5.

The accelerator described above with reference to FIGS. 10, 13, 16, and 19 may be simply implemented by disposing MUXs before or after an input register or a filter register. A circuit controlling such MUXs may be embodied by a simple state machine. Although power overhead may occur due to such addition of the circuit, it may be sufficiently compensated by a reduction in memory read energy by a considerable reduction in memory access to input data, and by a reduction in leakage power by a memory being disabled while the memory is not being read. In addition, in many cases, it is possible to considerably reduce power consumption of an entire system.

Although illustrated are an 8×8 input data map, a 3×3 filter, an adder tree-based 16-operand MAC, examples are not limited thereto. The foregoing descriptions are also applicable to convolution operations based on input data maps, filters, and MACs of various structures and sizes.

For example, in a case in which a convolution operation with a 5×5 filter and a stride of 1 is performed in a 32-operand MAC, the weight/input data muxing structure and the weight/input data shifting structure described above are also applicable. In such a case, $n_{max}$ may be determined to be 2 by Equation 1 above, and convolution operations corresponding to two filters may be performed when input data packed into one word in an input memory is read once.

For another example, in a case in which a convolution operation with a 3×3 filter and a stride of 2 is performed in a 16-operand MAC, the weight/input data muxing structure and the weight/input data shifting structure described above are also applicable. In such a case, $n_{max}$ may be determined to be 2 by Equation 1 above, and convolution operations corresponding to two filters may be performed when input data packed into one word in an input memory is read once.

Figure 22:
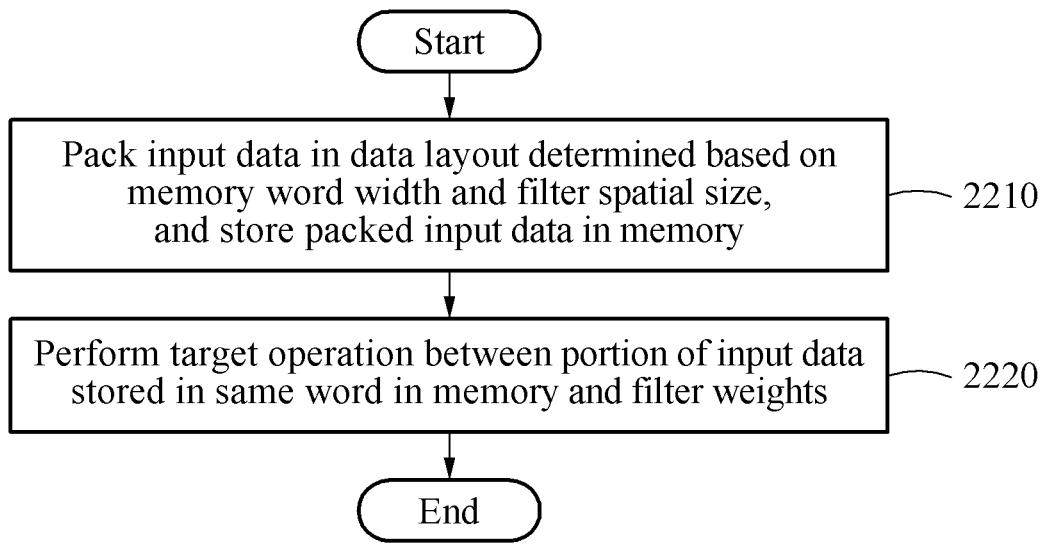
FIG. 22 illustrates an example of a flowchart of a method of operating an accelerator.

FIG. 22 illustrates an example of a flowchart of a method of operating an accelerator.

Referring to FIG. 22, a method of operating an accelerator includes operation 2210 of packing input data with a data layout determined based on a word width of a memory in the accelerator and a spatial size of a filter to be applied to a target operation and storing the packed input data in the memory, and operation 2220 of performing the target operation between a portion of the input data stored in a same word in the memory and weights of the filter. For a more detailed description of operations 2210 and 2220, reference may be made to what is described above with reference to FIGS. 1 through 21, and thus a more detailed and repeated description of the operations 2210 and 2220 will be omitted here for brevity.

What is described above may be applicable to an accelerator included in an electronic device, and it is possible to effectively reduce power consumption of the electronic device by increasing a storage space efficiency of a memory and decreasing the number of times of reading input data from an input memory.

Figure 23:
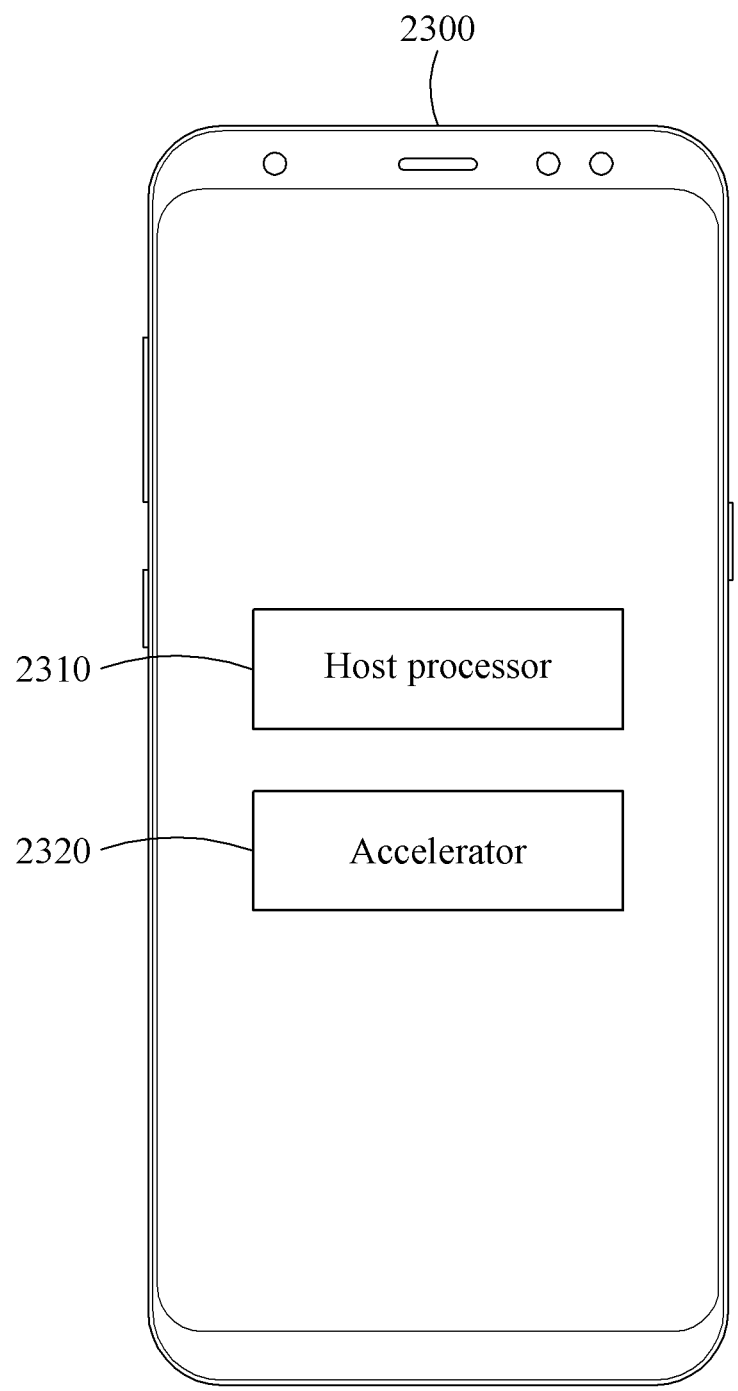
FIGS. 23 and 24 illustrate examples of an electronic device.
Figure 24:
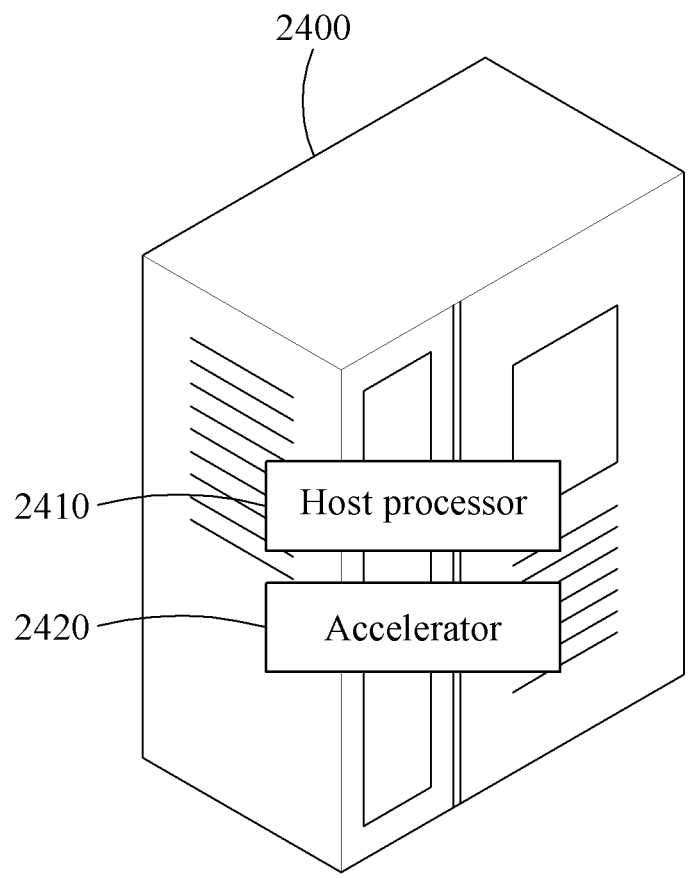

FIGS. 23 and 24 illustrate examples of an electronic device.

Referring to FIG. 23, an electronic device may be embodied as a user terminal 2300. Although the user terminal 2300 is illustrated as a smartphone in FIG. 23 for the convenience of description, other devices including, for example, a computing device such as a personal computer (PC), a tablet PC, and a laptop, a wearable device such as a smart watch and smart eyeglasses, a home appliance such as a smart speaker, a smart TV, and a smart refrigerator, and other devices such as a smart vehicle, a smart kiosk, an Internet of things (IoT) device, and a robot may be used without a limit. The user terminal 2300 may directly obtain data to be inferred using a neural network. A host processor 2310 may generate an instruction to be executed by an accelerator 2320 in response to a request for processing the neural network in which a target operation is to be performed in the accelerator 2320. When the instruction is executed, the accelerator 2320 may pack input data with a data layout determined based on a word width of an internal memory and a spatial size of a filter to be applied to the target operation and store the packed input data in the internal memory, and perform the target operation between a portion of the input data stored in a same word in the internal memory and weights of the filter. The user terminal 2300 may provide a user with an inference result obtained through the neural network including the target operation without changing it, or perform a subsequent operation that is based on the result through the host processor 2310.

Referring to FIG. 24, an electronic device may be embodied as a server 2400. The server 2400 may be a separate device distinguished from a user terminal controlled by a user, and may communicate with the user terminal through a wired and/or wireless network. Data desired to be inferred using a neural network may be collected by the user terminal and then transferred to the server 2400. As described above, a host processor 2410 may generate an instruction executable by an accelerator 2420 in response to a request for processing the neural network in which a target operation is to be performed in the accelerator 2420. When the instruction is executed, the accelerator 2420 may pack input data with a data layout determined based on a word width of an internal memory and a spatial size of a filter to be applied to the target operation and store the packed input data in the internal memory, and perform the target operation between a portion of the input data stored in a same word in the internal memory and weights of the filter. The server 2400 may return a result inferred through the neural network including the target operation to the user terminal, and the user terminal may simply provide a user with such an inference result received from the server 2400 or perform a subsequent operation that is based on the inference result.

The accelerator, and other apparatuses, units, modules, devices, and other components described herein with respect to FIGS. 1, 2, 10, 13, 16, 19, 23, and 24 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-24 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating an accelerator comprising an input memory configured to perform a target operation, the input memory comprising words for storing, at one time, input data comprising a data map, the words having a same word width, the method comprising:
    determining a number of filters corresponding to an input data to be packed into a same word, wherein the input data to be packed into the same word is determined based on a layout and wherein the layout is determined based on a word of the input memory and a spatial size of a filter to be applied to the target operation;
    determining a virtual filter based on the number of filters, a spatial size of a filter and a stride size of the filter;
    packing the input data corresponding to a one stride of the virtual filter as the same word; and
    performing the target operation between a portion of the packed input data stored in the same word in the input memory and weights of the filter.

2. The method of claim 1, wherein the number of the filters is determined based on a horizontal size and a vertical size of each of the filters, a number of channels of the input data, a stride size of one or more of the filters, and a number of operand pairs simultaneously processible by an operator configured to perform the target operation.

3. The method of claim 1, wherein the determining the virtual filter comprises determining a spatial size of the virtual filter and a stride size of the virtual filter based on the number of filters, the spatial size of the filter and the stride size of the filter.

4. The method of claim 1, wherein the packing comprises performing an im2col transformation.

5. The method of claim 1, wherein the performing of the target operation comprises:
    fetching the input data stored in the same word in the memory to an input register;
    fetching the weights of the filter to a filter register;
        performing a first target operation between a first portion in the input register and the weights in the filter register; and
        performing a second target operation between a second portion fetched to the input register and the weights in the filter register.

6. The method of claim 5, wherein the performing of the target operation comprises:
    muxing the weights used in the filter register for the first target operation; and
    performing the second target operation between the second portion and the muxed weights.

7. The method of claim 5, wherein the performing of the target operation comprises:
    muxing the second portion of the input data fetched to the input register after the first target operation; and
    performing the second target operation between the muxed second portion of the input data and the weights.

8. The method of claim 5, wherein the performing of the target operation comprises:
    muxing the weights used for the first target operation and re-storing the muxed weights in the filter register; and
    performing the second target operation between the second portion of the input data and the re-stored weights.

9. The method of claim 5, wherein the performing of the target operation comprises:
    muxing the second portion of the input data fetched to the input register and re-storing the muxed second portion of the input data in the input register, after performing the first target operation; and
    performing the second target operation between the re-stored muxed second portion of the input data and the weights.

10. The method of claim 1, wherein the target operation comprises a convolution operation of a neural network executed in the accelerator.

11. The method of claim 1, wherein the performing of the target operation comprises:
    performing the target operation in a multi-operand multiplier-accumulator (MAC) to which the first portion of the input data stored in the same word and the weights of the filter are input.

12. The method of claim 1, wherein the accelerator is comprised in a user terminal to which data to be inferred through a neural network for which the target operation is performed is input, or is comprised in a server receiving the data to be inferred from the user terminal.

13. An accelerator configured to perform a target operation, the accelerator comprising:
    an input memory comprising words for storing, at one time, input data comprising a data map, the words having a same word width;
    a processor configured to:
        determine a number of filters corresponding to an input data to be packed into a same word, wherein the input data to be packed into the same word is determined based on a layout and wherein the layout is determined based on a word of the input memory and a spatial size of a filter to be applied to the target operation, determine a virtual filter based on the number of filters, a spatial size of a filter and a stride size of the filter, and pack the input data corresponding to a one stride of the virtual filter as the same word; and an operator configured to perform the target operation between a portion of the packed input data stored in the same word in the input memory and weights of the filter.

14. The accelerator of claim 13, further comprising:
an input register into which the input data stored in the memory is fetched; and
a filter register into which the weights of the filter are fetched,
wherein the operator is configured to:
perform a first target operation between the weights and, in the input register: a first portion of the input data and a part of a second portion; and
perform a second target operation between the weights and, in the input register: the second portion of the input data and a part of the first portion of the input data.

15. An electronic device, comprising:
a host processor configured to generate an instruction executable by an accelerator in response to a request for processing, in the accelerator, a neural network for which a target operation is performed, the accelerator comprising an internal memory, the internal memory comprising words for storing, at one time, input data comprising a data map, the words having a same word width; and
the accelerator configured to, when the instruction is executed:
determine a number of filters corresponding to an input data to be packed into a same word, wherein the input data to be packed into the same word is determined based on a layout and wherein the layout is determined based on a word of the internal memory and a spatial size of a filter to be applied to the target operation,
determine a virtual filter based on the number of filters, a spatial size of a filter and a stride size of the filter,
pack the input data corresponding to a one stride of the virtual filter as the same word, and
perform the target operation between a portion of the packed input data stored in the same word in the internal memory and weights of the filter.

16. An accelerator configured to perform a target operation, the accelerator comprising:
an input memory configured to pack input data into one word according to a virtual filter; a filter memory configured to store weights of a filter applied to the target operation;
an operator comprising a plurality of multipliers configured to perform the target operation between the packed input data stored in the one word in the input memory and one or more of the weights stored in the filter memory, wherein the packed input data in the one word corresponds to a one stride of the virtual filter, wherein the virtual filter is determined based on a number of filters, a spatial size of the filter and a stride of the filter and wherein the number of filters corresponds to the packed input data into the one word; and
a multiplexer disposed between the operator and either the input memory or the filter memory, wherein
in a case in which the multiplexer is disposed between the operator and the filter memory, the multiplexer is configured to selectively transfer one of the weights stored in the filter memory to each of the multipliers of the operator, and
in a case in which the multiplexer is disposed between the operator and the input register, the multiplexer is configured to selectively transfer one set of the packed input data stored in the input memory to each of the multipliers of the operator.

17. The accelerator of claim 16, further comprising:
an input register to which the packed input data stored in the word in the input memory is fetched; and
a filter register to which the weights of the filter are fetched,
wherein, in the case in which the multiplexer is disposed between the operator and the filter memory, the multiplexer is selectively disposed between the filter register and one of the filter memory and the operator, and
wherein, in the case in which the multiplexer is disposed between the operator and the input memory, the multiplexer is selectively disposed between the input register and one of the input memory and the operator.

18. The accelerator of claim 16, wherein the target operation comprises a convolution operation performed in a neural network executed in the accelerator.

* * * * *